United States Patent [19]

Fukuzawa et al.

[11] Patent Number: 5,475,488
[45] Date of Patent: Dec. 12, 1995

[54] HEAD FLYING HEIGHT MEASURING APPARATUS

[76] Inventors: Tadashi Fukuzawa, 3-23-2 Kyodo, Setagaya-ku, Tokyo, Japan, 156; Teiji Hisano, 4-1547 Endo, Fujisawa-shi, Kanagawa-ken, Japan, 252; Kohichi Ikarugi, 7-7 Hishinumakaigan, Chigasaki-shi, Kanagawa-ken, Japan, 253; Tetsuji Morita, 1-10-17-304, Zengyo, Fujisawa-shi, Kanagawa-ken, Japan, 251; Kohki Noda, 2-18-8 Kameino, Fujisawa-shi, Kanagawa-ken, Japan, 252

[21] Appl. No.: 148,100

[22] Filed: Nov. 5, 1993

[30] Foreign Application Priority Data

Nov. 6, 1992 [JP] Japan .................. 4-297004

[51] Int. Cl.⁶ ........................................ G01B 9/02
[52] U.S. Cl. ............................. 356/357; 356/359
[58] Field of Search .................... 356/357, 358, 356/359

[56] References Cited

U.S. PATENT DOCUMENTS

| | | | |
|---|---|---|---|
| 4,593,368 | 6/1986 | Fridge et al. | 356/357 |
| 4,630,926 | 12/1986 | Tanaka et al. | 356/357 |
| 5,280,340 | 1/1994 | Lacey | 356/357 |

OTHER PUBLICATIONS

Edwards, R. B.; "Three–Color Laser Interferometer" *IBM Technical Disclosure Bulletin*, vol. 16, No. 2 (Jul. 1973) pp. 595–596.
"Automatic Digital Flying Height Tester", Pacific Precision Laboratories, Inc., 1988.
Pochi Yeh, "Optical Waves in layered Media", Wiley–Interscience Publication, John Wiley and Sons, 1988, pp. 83–91.

*Primary Examiner*—Richard A. Rosenberger

[57] ABSTRACT

A high-sensitivity apparatus having simple constitution that measures the flying height of a magnetic head. Light emitted from a white light source 25 is directed to the gap between a disk 23 and a head 21, and subjected to multiple reflection between the disk 23 and the head 21. Reflected light from an opaque object, which may be either the disk 23 or the head 21, is divided into at least three components having respective wavelength regions which are directed to different photodetectors 35, 36, and 37 for the respective wavelength regions. An estimation device 38 estimates the flying height of the head according to the least-square method from the outputs of the photodetectors using functions prepared in advance for the respective wavelength regions, and correlates the disk-head gap and the reflected light intensities detected by the respective photodetectors. Real-time calculation according to the least-square method is performed by means of a table look-up technique or a tracking servo technique.

11 Claims, 15 Drawing Sheets

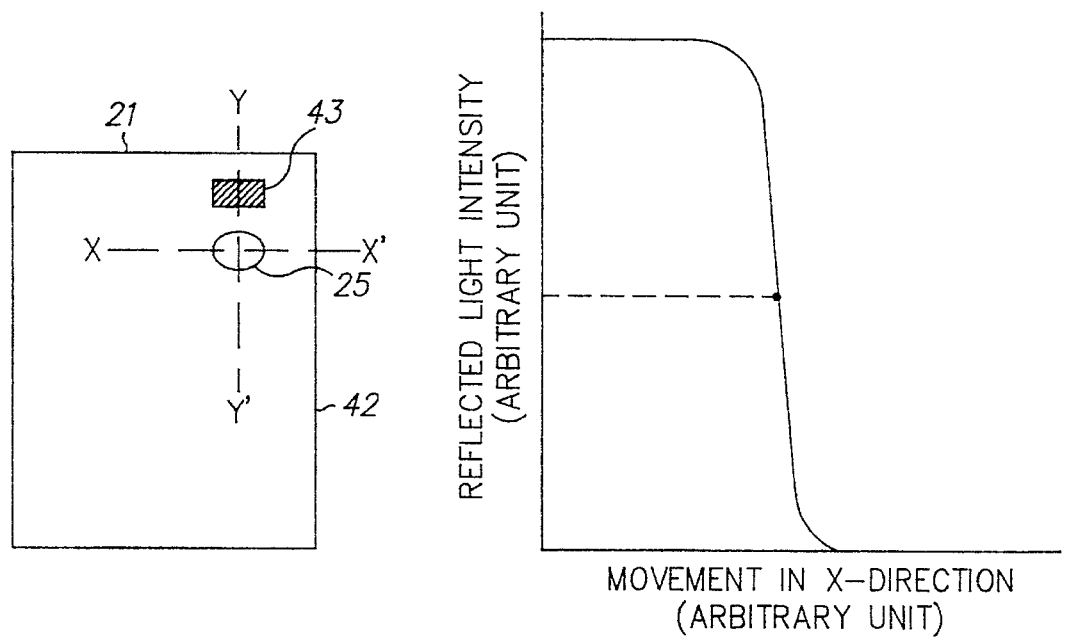
FIG. 14
FIG. 15
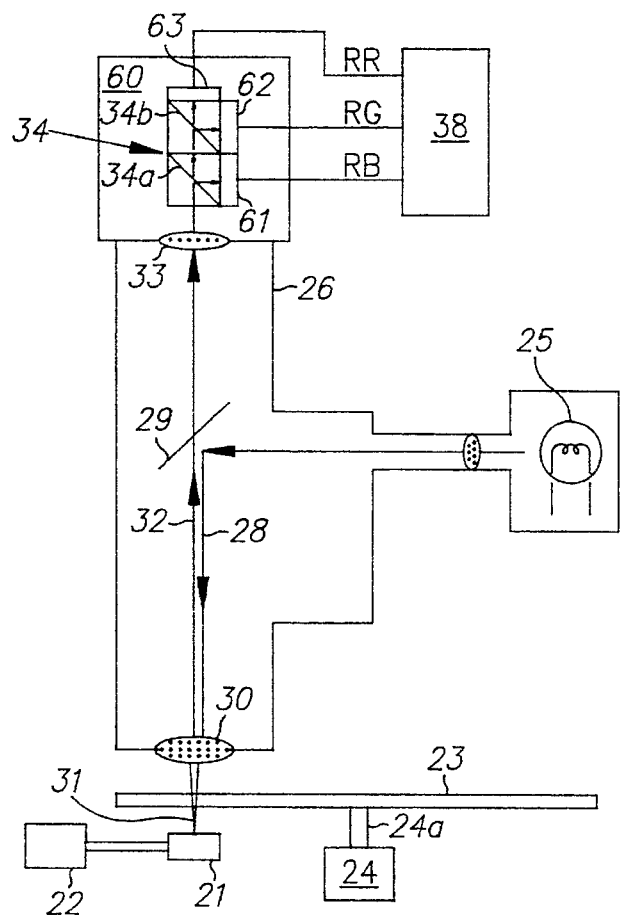
FIG. 18

3-BEAM SIMULATION
$\lambda_1$ — 670 nm
$\lambda_2$ — 750 nm
$\lambda_3$ — 830 nm SPAN — 3.2 μm
S/N — +14 dB

HEAD FLYING HEIGHT MEASURING APPARATUS

TECHNICAL FIELD

The present invention relates to an apparatus and method for measuring the flying height of a head used in a magnetic disk device, an optical disk device, or another such device. More specifically, the invention relates to an apparatus and method for estimating the flying height of such a head according to the least-square method. In this specification, the "head" includes not only the read/write (R/W) gap portion for reading data from and writing data to a disk, but also the slider portion. Therefore, the flying height of the head as a measurement subject includes both the head-disk gap in the vicinity of the R/W gap and that in the area of the air-bearing surface of the slider.

BACKGROUND OF THE INVENTION

Magnetic disk devices are used in a very wide variety of fields, and development continues to realize more compact and higher density devices. To further increase the density, it is necessary to reduce the gap (i.e., the flying height of the magnetic head) between the magnetic head and the magnetic disk in the R/W gap portion from 0.2 μm (currently available) to 0.1 μm. To this end, it is important to measure the flying height (about 0.1 μm) of manufactured magnetic heads to test whether they can fly as designed.

There is a previously known method of measuring the flying height in which an unknown gap (flying height) is determined by illuminating a magnetic head that is flying above a transparent quartz disk by shining white light through the disk, and comparing the spectral line shape of the interference color caused by the gap between the magnetic head and the quartz disk with the theoretical value (See "Automatic Digital Flying Tester" in a catalog published by Pacific Precision Laboratories, Inc., 1988).

With reference to FIG. 1, the principle of optically measuring the flying height is described below. FIG. 1 shows a state in which a transparent quartz disk 1 and a magnetic head 3 that is flying are separated by a distance d. Light 4 from the quartz disk 1 reaching an air gap 2 at an incident angle $\theta_1$ is refracted to enter the air gap 2 at a refraction angle $\theta_2$, and made incident on the head 3 at an incident angle $\theta_2$ that is equal to the above refraction angle. One part 5 of the light enters the head 3 at an angle $\theta_3$ and is absorbed therein. The remaining part of the light is reflected by the head 3, and is then divided into light 7 that is again reflected by the surface of the quartz disk 1 and light 6 that enters the quartz disk 1. Through this multiple reflection, the intensity of the light that includes beams having different optical paths is modulated by the interference effect.

Taking this effect into account, the reflection coefficient r of the light 6 output from the quartz disk 1 is expressed by the following equation if the incident light is an S wave (Pochi Yeh, "Optical Waves in Layered Media," A Wiley-Interscience Publication, John Wiley and Sons, 1988, New York):

$$r = \frac{r_{12} + r_{23}\mathrm{Exp}(-i2\Delta)}{1 + r_{12}r_{23}\mathrm{Exp}(-i2\Delta)} \quad (1)$$

where $$r_{12} = \frac{k_1 - k_2}{k_1 + k_2} \quad (2)$$

$$r_{23} = \frac{k_2 - k_3}{k_2 + k_3} \quad (3)$$

$$k_i = \frac{2\pi}{\lambda} n_i \cos\theta_i \quad (i = 1,2,3) \quad (4)$$

$$\Delta = k_2 \cdot d \quad (5)$$

In the above equations, $n_1$, $n_2$, and $n_3$ represent the complex refractive indices of the quartz disk 1, air, and magnetic head 3, respectively; $\lambda$, the wavelength of the incident light; d, the air gap, that is, the flying height; c, the speed of light; and $\omega$, the angular frequency of the incident light. Further, $r_{12}$ represents the reflection coefficient at the interface between the disk 1 and the air gap 2; $r_{23}$, the reflection coefficient at the interface between the air gap 2 and the magnetic head 3; and $k_i$, the i-component of the wave propagation vector.

Since the quartz disk 1 and air have little absorption loss, their refractive indices $n_1$ and $n_2$ are real numbers. However, the refractive index $n_3$ is a complex number. Therefore, from Eqs. (3) and (4), $r_{23}$ is a complex number, and is expressed by $$r_{23} = -|r_{23}|\mathrm{Exp}(i\phi) \quad (\phi > 0) \quad (6)$$

In general, $|r_{23}|$ and $\phi$ are functions of $\lambda$. Using these parameters, Eq. (1) can be written, using only real numbers, as $$r = \frac{r_{12} - |r_{23}|\mathrm{Exp}\{-i(ad-\phi)\}}{1 - r_{12}|r_{23}|\mathrm{Exp}\{-i(ad-\phi)\}} \quad (7)$$

where $$a = 2k_2 = \frac{4\pi}{\lambda} n_2\cos\theta_2 \quad (8)$$

At this time, it should be considered that what is actually measurable is the reflectance R, rather than the reflection coefficient r. The reflectance R is expressed by $$R = |r|^2 = \frac{R_{12} + R_{23} - r_{12}|r_{23}|\cos(ad-\phi)}{1 + R_{12}R_{23} - 2r_{12}|r_{23}|\cos(ad-\phi)} \quad (9)$$

where $$R_{12} = r_{12}^2 \quad (10)$$

$$R_{23} = |r_{23}|^2 \quad (11)$$

The reflected light intensity is a product of the intensity of the incident light and the coefficient R. Therefore, Eq. (9) represents, without a scaling factor, the reflected light intensity when light having a certain wavelength $\lambda$ is incident on a gap d at an incident angle $\theta_1$.

The value of the complex refractive index $n_3$ of the magnetic head 3 differs according to the material and the laminated structure of the head 3 as well as the coating method. However, since $n_3$ takes a fixed, specific value once the structure, material, and so on have been determined, it can be obtained by dividing $n_3$ into a real part (refractive index) and an imaginary part (extinction coefficient), and calculating each of these parts as parameters when fitting a theoretical equation (Eq. (9) or a modification thereof) into measurement data.

FIGS. 2–4 are examples of the wavelength dependence of the intensity R of the light reflected to the quartz disk 1, which were calculated by using Eq. (9). The wavelength range is 350–800 nm, and the incident angle is 0 degree. The flying heights (air gaps) d are indicated in the graphs as parameters. It can be seen that the spectral line shape varies with the flying height.

Conventional methods for measuring flying height utilize the above white light interference effect occurring at the air gap. That is, the variation, with the distance d, of the interference color of the white light incident on the magnetic head flying above the transparent quartz disk is determined in advance by measuring its spectrum through the use of a diffraction grating, and the actual distance d of the magnetic head is calculated from the spectral line shape. However, as is apparent from FIG. 2, in a small flying height range (80–120 nm), the reflected light intensity varies monotonically with the wavelength. Particularly when a lamp, such as a tungsten lamp having low brightness in a short wavelength range is used, a spectral variation is hardly detected even when the flying height is varied. Therefore, it can be said that the methods conventionally used widely are not suitable for the evaluation of magnetic heads having a small flying height, which will form the majority of those used in future magnetic disks. Furthermore, a very bright light source needs to be employed to compensate for the light intensity reduction that occurs when the light is separated into its spectral components. This increases the price of the measurement apparatus used with such optical devices as a diffraction grating.

To avoid the above problems, other methods have been proposed in which light beams of two wavelengths are employed as probing light beams. For example, in PUPA No. 1-260305, an He-Ne laser (633 nm) and a semiconductor laser (830 nm) are employed as two kinds of light source. To estimate the flying height of the head, the reflected light intensity is measured for the respective wavelengths and the measured values are plotted on a curve for the respective wavelengths, correlating the reflected light intensity and the disk-head gap (output function of a photodetector). However, the actual comparison of the measured values and the correlation curves is performed by using two tables stored in a ROM, each describing the relationship between the reflected light intensity and the flying height. Consequently, the flying height cannot be determined correctly because of the global decision error (described later).

The least-square method can be easily applied to the above method of using two-color laser beams as a technique for comparing measured values with the output function of a photodetector. However, this combination has the following associated problems.

FIG. 5 shows two curves representing the relationship of the gap (flying height) d separating the magnetic head and the quartz disk and the intensity of the reflected light input from the quartz disk, which have been calculated and plotted for the two wavelengths, 633 nm (indicated by (A)) and 830 nm (indicated by (B)). These two functions are represented by $F_{633}(d)$ and $F_{830}(d)$, respectively.

A description is now given of how an experimenter estimates the flying height d on the assumption that the true value of d is 58 nm. There is a gap dependency of the sum of the squares of the respective differences between the two measured reflected light intensities, $^{633}R_{58}$ and $^{830}R_{58}$, and the corresponding values on the characteristic curves $F_{633}(d)$ and $F_{830}(d)$ in FIG. 5.

$$Es(d) = \sqrt{E_{58}(d)} \qquad (12)$$
$$= \sqrt{(^{533}R_{58} - F_{633}(d))^2 + (^{830}R_{58} - F_{830}(d))^2}$$

The minimum of the left side of this equation gives the flying height d. However, it may be that the function Es(d) has a local minimum in addition to the true minimum that gives the flying height d. If this kind of local minimum is located within the range of measurement errors, a false flying height, rather than the true one, may be given. This type of error is called a global decision error.

In FIG. 6, the minimum Lm(d) of the local minima of functions Es(d) are plotted for various gaps. There exist values of the gap interval d that are associated either with no local minimum within the range of FIG. 6 or with a plurality of local minima. FIG. 6 shows all the local minima obtained when d is varied at intervals of 1 nm.

While the minimum of Es(d) gives the true gap itself, that is, the flying height itself, Lm(d) is a local minimum other than the minimum of Es(d) and therefore does not correspond to the true gap. If the local minimum is located within the range of measurement error, it may give a false flying height. In other words, the difference between Lm(d) and the zero level can be regarded as the margin of measurement error.

When the two wavelengths of the semiconductor laser and the He-Ne laser are used, the measurement error is about 0.005 in noise level as shown in FIG. 6. Therefore, when the gap interval length is changed between 50 nm and 900 nm, the margin of error is actually entirely contained in the measurement error in most areas. Thus, the true flying height cannot be obtained.

Further, the method for generating two-color laser beams by using separate light sources needs an optical system to collimate the two beams into a single beam. Where a semiconductor laser is used, a lens system is needed to compensate for the difference in the aspect ratio of the semiconductor laser beam.

Furthermore, conventionally, the least-square calculation for estimating the flying height is performed by an off-line-type algorithm. Therefore, when the least-square method is applied to the method of optically determining the flying height, it is very difficult to automate the measurement or measure the dynamics of the flying height of the head.

Therefore, what is needed is an apparatus for measuring the head's flying height that has high sensitivity and a simple constitution. The apparatus should also use real-time, least-square calculation for estimating the flying height of the head.

SUMMARY OF THE INVENTION

The present invention is an apparatus for measuring the flying height of a head made to fly by directing an air flow over the surface of a rotating disk, wherein either the head or the disk has a transparent body and the other has an opaque body. The apparatus includes drive means for rotating said disk; means for positioning said head above the surface of said disk; a white light source; a first optical system for directing light from said white light source to the gap between said disk and said head in such a way that said light is reflected a multitude of times by said disk and said head; a plurality of photodetector means; a second optical system for dividing said light reflected from either said disk or said head having said opaque body into at least three components, each occupying a particular wavelength region, and for directing each component to a different one of said photodetector means; and means for estimating the flying height of said head according to the least-square method from the outputs of said photodetector means on the basis of predetermined functions relating to said respective wavelength regions, each function correlating a disk-head gap with a reflected light intensity detected by said photodetector means.

Instead of using in the second optical system an optical element for dividing the reflected light into spectral components, there may be provided in the first or second optical system another optical element for transmitting one at a time in a time-divisional manner at least three components of white light, each occupying a particular wavelength region.

In place of the white light source, there may be employed a light source for emitting a single beam of light composed of at least three monochrome component beams.

According to another aspect of the invention, there is provided an apparatus for estimating a physical quantity x according to the least-square method from the measured values $r_i$ of physical quantities $y_i$ when nonlinear functions $f_i$ for converting said physical quantity x into said physical quantities $y_i$ are analytically given in advance ($i=1,2, \ldots, n$, $n \geq 2$), said apparatus comprising means for calculating estimates $f_i(x^*)$ of $y_i$ from the estimate $x^*$ of the current x; means for calculating errors $e_i$ from the differences between $r_i$ and $f_i(x^*)$; means for calculating a compiled error that is given as a linear combination of $w_i e_i$, where $w_i = df_i(x^*)/dx_*$; and linear control means for updating said estimate $x^*$ of x on the basis of said compiled error.

BRIEF DESCRIPTION OF THE DRAWING

FIG. 14 shows an example of the scanning of a laser beam spot across the slider surface of a magnetic head.

FIG. 15 is a graph showing the variation of the reflected light intensity with the scanning of the laser beam spot.

FIG. 18 is a diagram showing the entire constitution of a measurement apparatus according to a third embodiment of the invention.

DESCRIPTION OF THE PREFERRED EMBODIMENTS

Embodiments of the present invention are described hereinafter with reference to the accompanying drawings. First, a description is given of an aspect of the invention that relates to the entire configuration of a measurement apparatus including a light source, an optical system, and photodetectors. Then, another aspect is described that relates to a procedure for real-time estimation of the flying height of a head based on the output signals of the photodetectors.

Configuration of the Measurement Apparatus (Embodiment 1)

Figure 7:
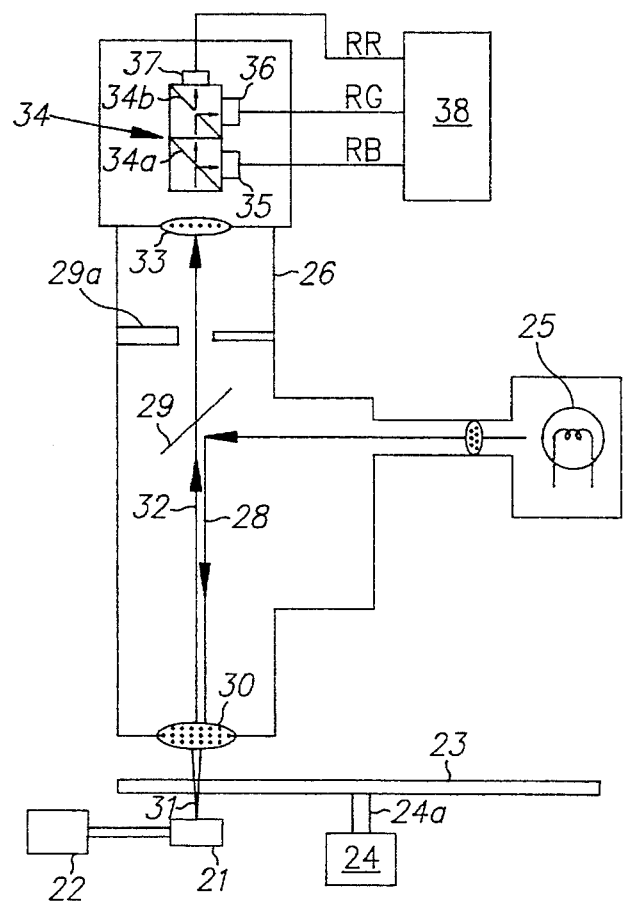
FIG. 7 is a diagram showing the entire configuration of a measurement apparatus according to a first embodiment of the present invention.

FIG. 7 schematically shows a measurement apparatus according to a first embodiment of the invention. An actuator 22 moves a magnetic head 21 to allow it to access a transparent quartz disk 23. The quartz disk 23 is rotated by a motor 24 while being supported by a spindle 24a. The magnetic head 21 is made to fly, at a distance d, by directing an air current over the rotating disk 23.

A light source 25 is a coaxial-type illuminator attached to an optical microscope with a long working distance. The illuminator 25 has a 20-W tungsten iodide lamp that is turned on when the illuminator receives power from a stable DC power supply. White light 28 emitted from the light source 25 is directed to the gap 31 between the disk 23 and the head 21 via a half mirror 29 and an objective lens 30, and falls onto the magnetic head 21 at a near-zero incident angle.

Reflected light 32 from the magnetic head 21 passes through an aperture 29a, an eyepiece 33, and an optical filter 34, which is composed of four prisms glued to each other. The interfaces 34a and 34b of the two prisms are coated with a dielectric layer. The interface 34a is formed in such a way as to reflect blue light and transmit the remaining components, and the interface 34b is formed in such a way as to reflect green light and transmit red light. The blue, green, and red components thus separated are directed to respective silicon photodetectors 35, 36, and 37, where they are converted into respective electrical signals in accordance with the intensities of the blue, green, and red components.

The optical microscope 26 is moved horizontally with respect to the disk 23 when the flying height is measured at a multiple of locations.

Figure 8:
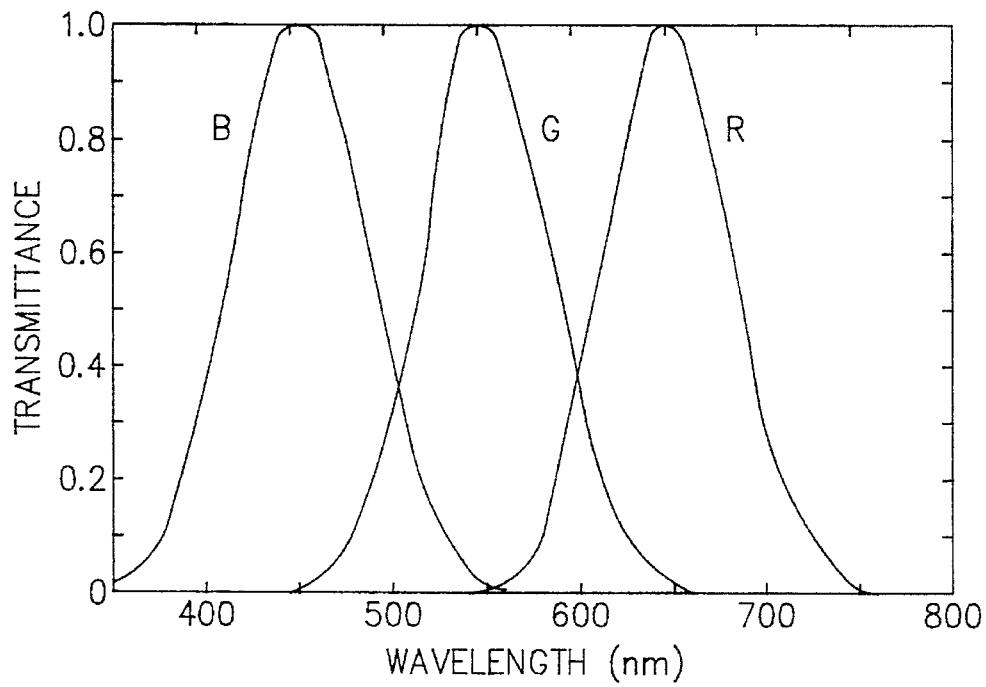
FIG. 8 is a graph showing the spectral responses of optical filters used in the measurement apparatus shown in FIG. 7.

FIG. 8 shows the spectral response of the optical filter 34 in which the ordinate represents the transmittance. The filter 34 is designed to have a halfwidth of 80 nm. The reflected light 32 is divided into three components occupying the respective wavelength regions of B (blue), G (green), and R (red). The separation between the adjacent peaks is about 100 nm.

Figure 9:
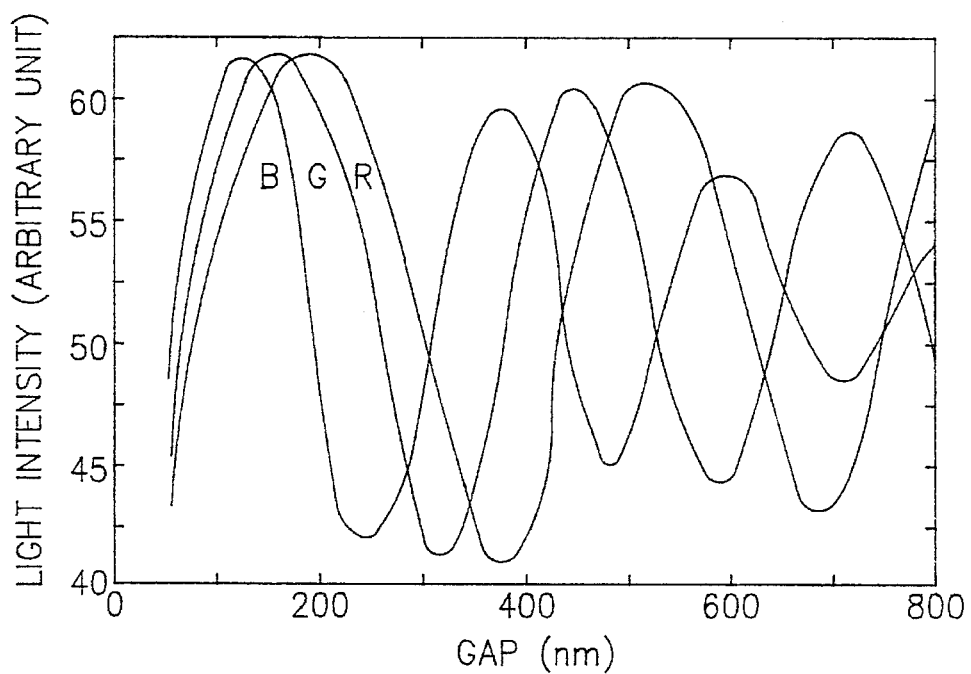
FIG. 9 is a graph showing the gap dependence of the intensities of reflected light components after the components have been transmitted from the optical filters shown in FIG. 7.

The computer-calculated results of the intensities of the component beams that transmit the respective filters are described below. It is assumed that the power spectral density and the transfer function of the light source 25 are flat in the visible region. The intensity of the reflected beam calculated from Eq. (9) and the transmission rate of said filter in said wavelengths are multiplied and integrated over the visible range. This product is taken as the intensity of the light after transmission through said filter. The intensity thus calculated represents the output signal level of the photodetector for that filter. Calculated results are shown in FIG. 9. As is apparent from this figure, a function having clear peaks and valleys is obtained even when the light for the observation is not monochrome but covers a broad wavelength range. Another point to be noticed is that a sufficiently large output signal can be obtained from the photodetector even without the use of a strong light source such as a laser.

As is discussed in detail in the section "Estimation of Head Flying Height," in the actual measurement the output functions FB(d), FG(d), and FR(d) of the respective photodetectors 35, 36, and 37 are determined in advance by employing Eq. (9) as a theoretical equation, or establishing a new theoretical equation by modifying Eq. (9) in consideration of the fact that the power spectral density of the actual light source and the transfer function of the actual optical system are not flat and fitting the theoretical function to the experimental data. The measured intensity values RB, RG, and RR of the component beams reflected from the head flying at an unknown height are sent to a signal processing device 38 (e.g., a computer) which estimates the flying height according to the least-square method. More specifically, the flying height is given as that value of d for which the following formula gives a minimum:

$$Es(d) = \sqrt{(RB - FB(d))^2 + (RG - FG(d))^2 + (RR - FR(d))^2} \quad (13)$$

Figure 10:
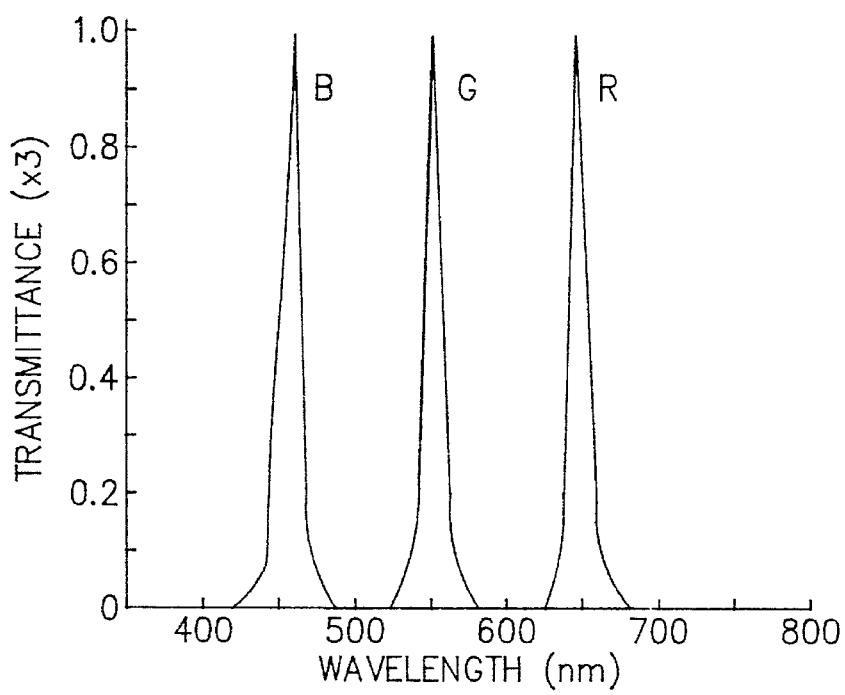
FIG. 10 is a graph showing the spectral responses of optical filters having narrower bandwidths.

A similar calculation was conducted for the case shown in FIG. 10, where three filters have respective spectral responses (half-width: 20 nm). The signal levels of the photodetectors decreased to about $1/15$ of those of the filters shown in FIG. 8. This signal level reduction increases noise levels and is therefore a disadvantage in terms of the global decision error.

Further, in the conventional method in which the wavelength profile of the reflected light intensity is measured by means of a diffraction grating, the levels of the signals produced by the individual photodetectors are less than one several-hundredth of those in the present embodiment, and the number of errors increases as a result. Therefore, in order to improve the measurement accuracy to the level equivalent to when broadband filters are employed, it is necessary to greatly increase the measurement time in order to take advantage of the averaging. This necessitates an increase in the number of measurement devices installed, and is therefore not desirable when the apparatus for measuring the flying height is used in test equipment at a factory for heads.

(Embodiment 2)

Figure 11:
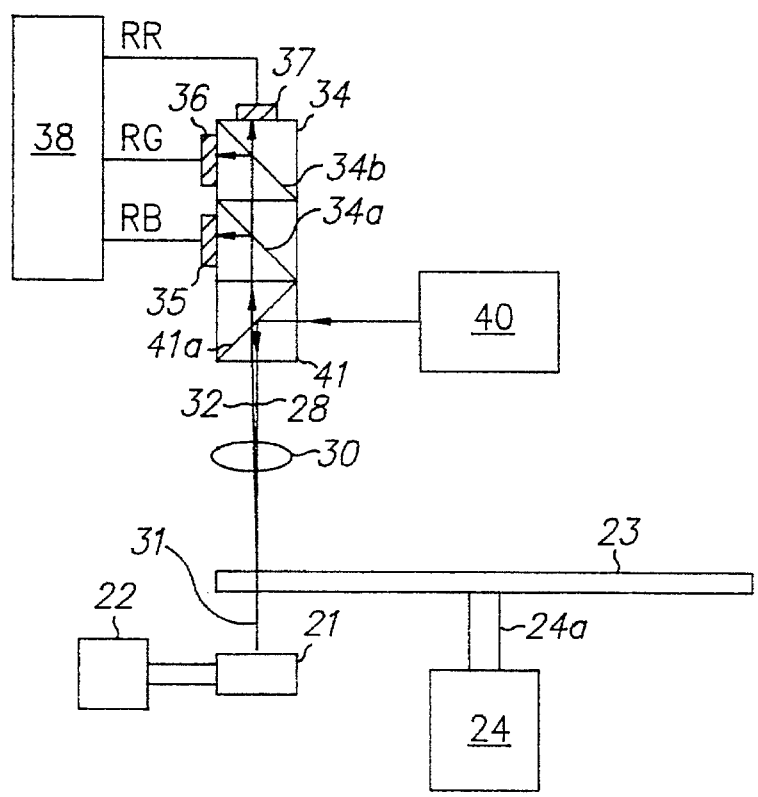
FIG. 11 is a diagram showing the entire configuration of a measurement apparatus according to a second embodiment of the invention.

A measuring apparatus according to a second embodiment is described below with reference to FIG. 11. A light source 40 is a helium-cadmium hollow cathode laser that concurrently emits laser beams of wavelengths 441.6 nm, 537.8 nm, and 636.0 nm. Since the helium-cadmium hollow cathode laser has large output intensities for the respective monochrome beams, the photodetectors receiving those monochrome beams can produce sufficiently large output signals. In addition, since three-color laser beams are emitted from the single light source, no optical devices (usually including optical parts such as a beam splitter) are required for collimating those beams.

The light emitted from the light source 40 is input to a beam splitter 41 and is thereby directed to a gap 31. The beam splitter 41 is composed of two prisms glued to each other, and the interface between the two prisms acts as a half mirror. Since the remaining construction of the apparatus in FIG. 11 is the same as that of the apparatus in FIG. 7 for the first embodiment, except for one difference, the same elements are given the same reference symbols and redundant descriptions are omitted here. The one difference is that the light source 40 and parts 41, 30, and 34, which constitute the optical system, are not provided in the optical microscope. However, these parts are mounted on a stage (not shown) and can be moved with respect to the magnetic head 21.

Figure 12:
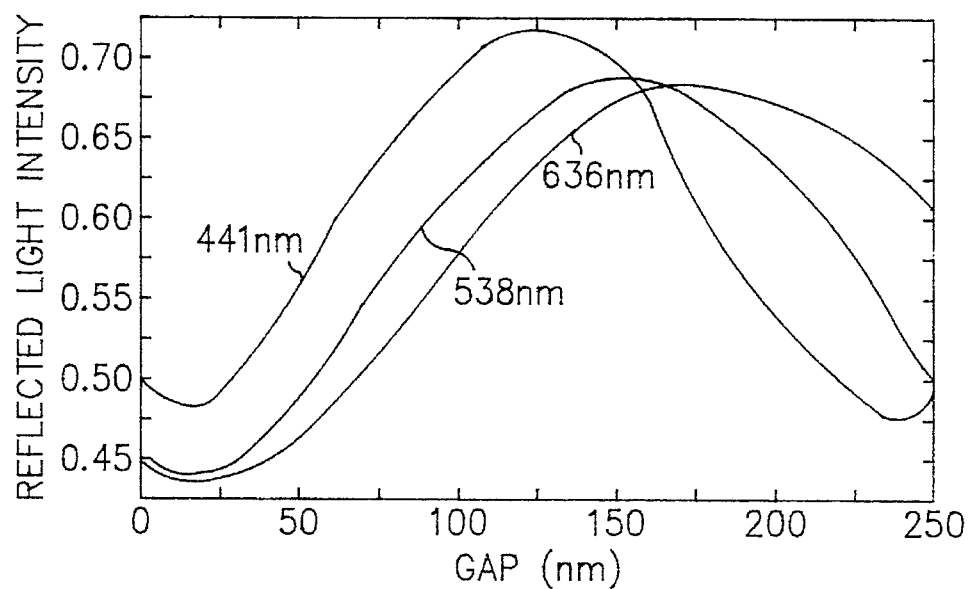
FIG. 12 is a graph showing the output functions of the photodetectors used in the measurement apparatus shown in FIG. 11.

The three-color laser light interferes with itself at the gap 31 between the head 21 and the disk 23 so that the reflected light intensity varies with the gap d. FIG. 12 shows functions for the respective wavelengths that correlate the gap d with the reflected light intensity; the parameters of Eq. (9) are selected so that the functions fit the measurement data.

The margin of error in the case of the three-color laser light is discussed below. The dependence on the gap of the sum of the squares of the respective differences between the measured values $^{441}R_{58}$, $^{538}R_{58}$, and $^{636}R_{58}$ of the reflected light intensities obtained when the flying height is 58 nm and the functions $F_{441}(d)$, $F_{538}(d)$, and $F_{636}(d)$ is given by $$Es = \sqrt{E_{58}(d)} \qquad (14)$$
$$= \sqrt{(^{441}R_{58} - F_{441}(d))^2 + (^{538}R_{58} - F_{538}(d))^2 + (^{636}R_{58} - F_{636}(d))^2}$$

Figure 1:
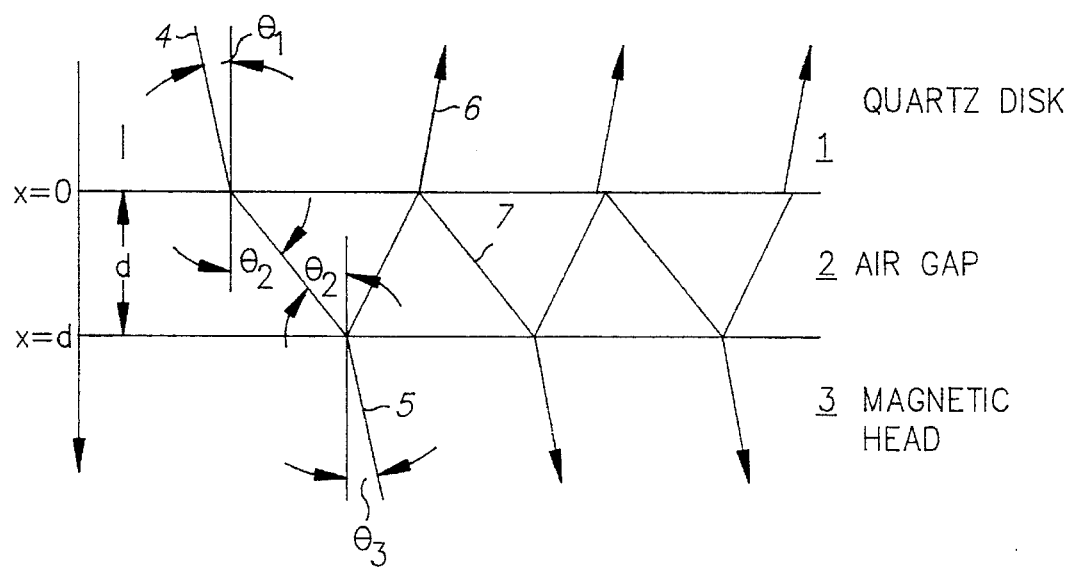
FIG. 1 illustrates the multiple reflection of light in the gap between a quartz disk and a magnetic head.
Figure 2:
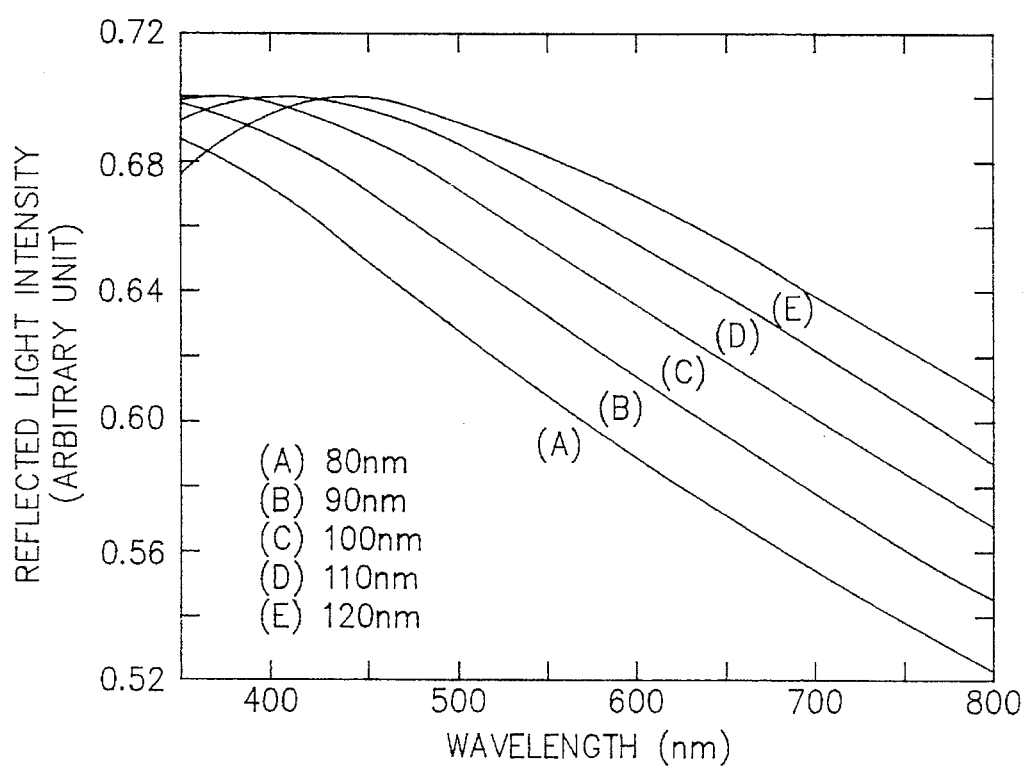
FIG. 2 is a graph showing the wavelength dependence of the reflected light intensity.
Figure 3:
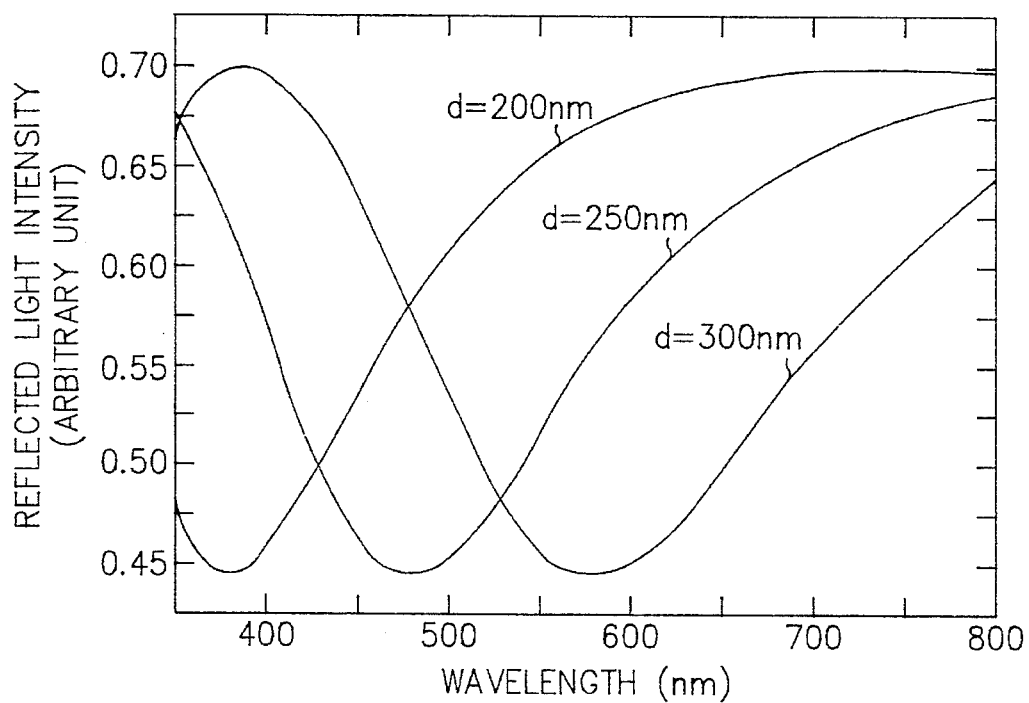
FIG. 3 is a graph showing the wavelength dependence of the reflected light intensity.
Figure 4:
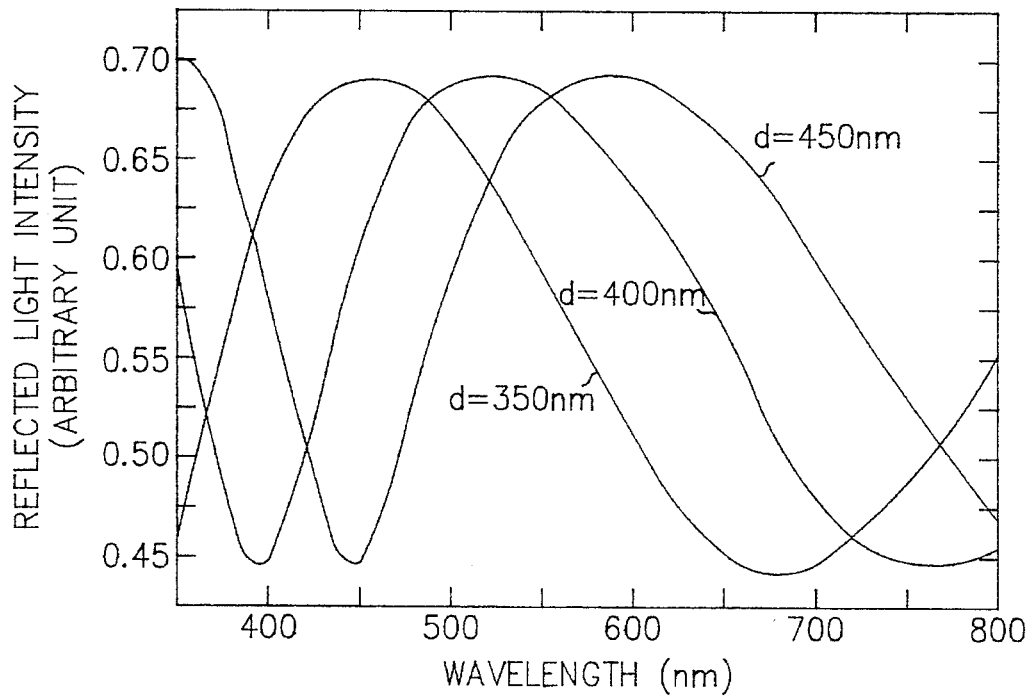
FIG. 4 is a graph showing the wavelength dependence of the reflected light intensity.
Figure 5:
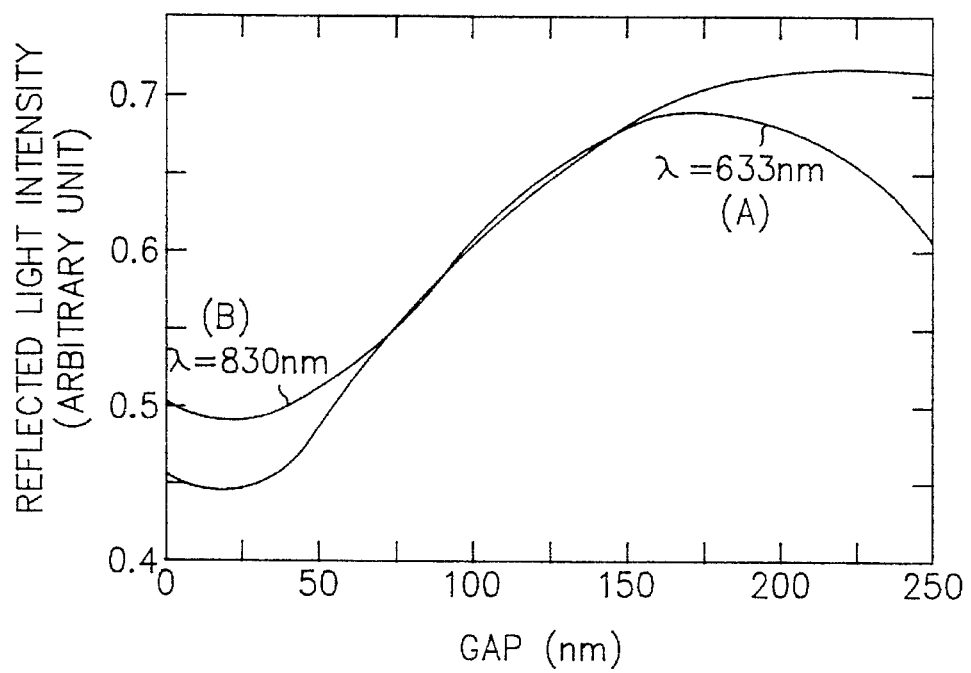
FIG. 5 is a graph showing the gap dependence of the reflected light intensity.
Figure 6:
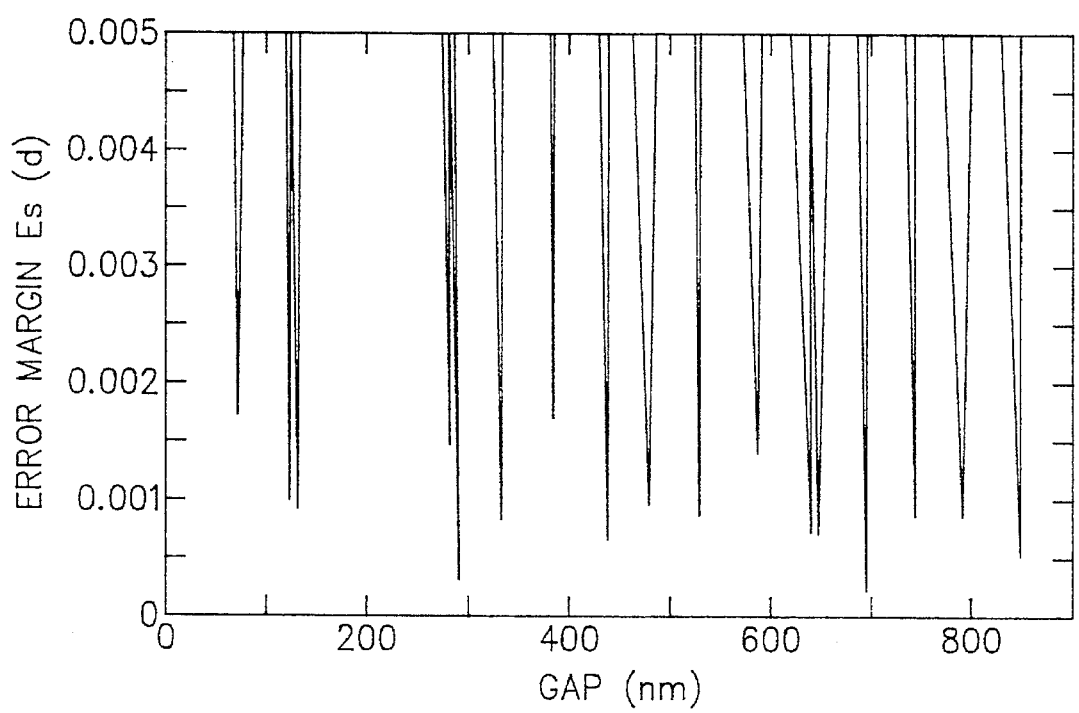
FIG. 6 is a graph showing the margin of error in the case where two-color light is employed and the least square method is used to compare measurement data and an output function.
Figure 13:
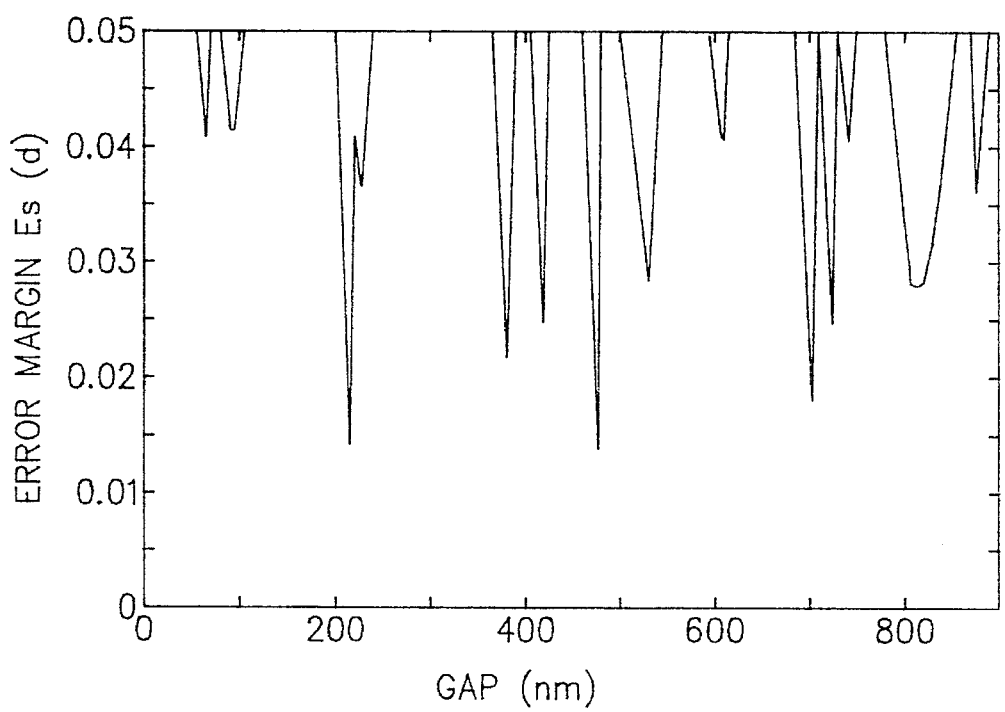
FIG. 13 is a graph showing the margin of error of the measurement apparatus shown in FIG. 11.

In FIG. 13, the minimum Lm(d) of the local minima of Es(d) corresponding to various gaps, which is the margin of error of the three-color measurement corresponding to that shown in FIG. 6 (two-color measurement), is plotted for various values of the gap d. It can be seen that the margin of error is more than ten times better than for the two-color measurement, which makes it possible to measure flying heights of 50 to 900 nm correctly without causing a global decision error. In an experiment using the above apparatus in which the flying height was estimated by the table look-up technique, a flying height of about 100 nm was measured accurately with an error of less than 4 nm.

By adjusting the optical system, the magnetic head can easily be illuminated by a laser beam spot. By using this technique, the point at which the flying height is measured can be determined precisely. As shown in FIG. 14, prior to the flying height measurement, the stages (not shown) are driven to scan the beam spot in two orthogonal directions, X—X' and Y—Y', and the variation of the reflected light intensity of one of the three colors is examined. That is, as shown in FIG. 15, a region in which the reflected light intensity varies greatly is detected as an edge 42 of the magnetic head 21, and the flying height measurement point is determined by using this region as a reference. A desired measurement point 44 close to the R/W gap 43 of the magnetic head was determined according to this method, and the flying height was measured by illuminating that point with the laser light.

Figure 16:
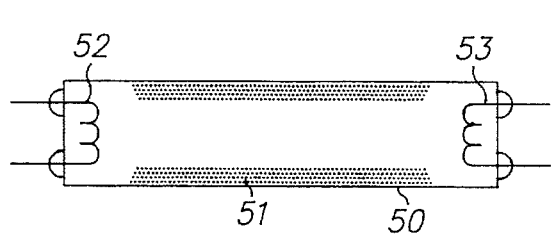
FIG. 16 is a schematic diagram showing an example of a low-pressure mercury vapor lamp that can be used in the measurement apparatus shown in FIG. 11.

A mercury lamp may be used as a light source. FIG. 16 shows a low-pressure mercury vapor lamp. The inner surface of a quartz tube 50 is coated with phosphors 51 that are mixed with Tb: $YPO_4$ and Eu: $YPO_4$, respectively, and the tube 50 is sealed after introduction of a mercury vapor therein. In FIG. 16, the reference numerals 52 and 53 represent filaments. When the mercury vapor is excited electrically, the lamp concurrently outputs a resonance line emission of 254 nm, green fluorescence of 547 nm, and red fluorescence of 619 nm.

Figure 17:
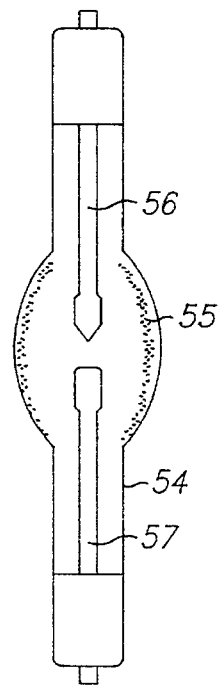
FIG. 17 is a schematic diagram showing an example of an ultra-high-pressure mercury vapor lamp that can be used in the measurement apparatus shown in FIG. 11.

Instead of the low-pressure mercury vapor lamp, an ultra-high-pressure mercury vapor lamp as shown in FIG. 17 may be used. The inner surface of a quartz tube 54 is coated with phosphors 55 mixed with Tb: $YPO_4$ and Eu: $YPO_4$, respectively, and sealed after introduction of a mercury vapor therein. In FIG. 17, the reference numerals 56 and 57 represent electrodes. Excitation of the mercury vapor causes strong resonance line emission of 365 nm instead of resonance line emission of 254 nm. Since mercury has a strong emission line at 550 nm, the lamp can concurrently emit three-color light beams, although it uses a phosphor activated only by trivalent europium. Since a high-pressure mercury arc lamp outputs intense light beams of 365 nm and 550 nm, it may be used in place of the ultra-high-pressure mercury vapor lamp.

If a high-pressure or ultra-high-pressure mercury vapor lamp is used, emissions of phosphors respectively activated by mercury resonance lines of 365 nm and 550 nm along with trivalent terbium and trivalent europium may be utilized to produce four-color light beams.

Since the mercury vapor lamps emit ultraviolet light, it is necessary to prepare optical filters that have characteristics suitable for such a wavelength region.

(Embodiment 3)

Figure 19:
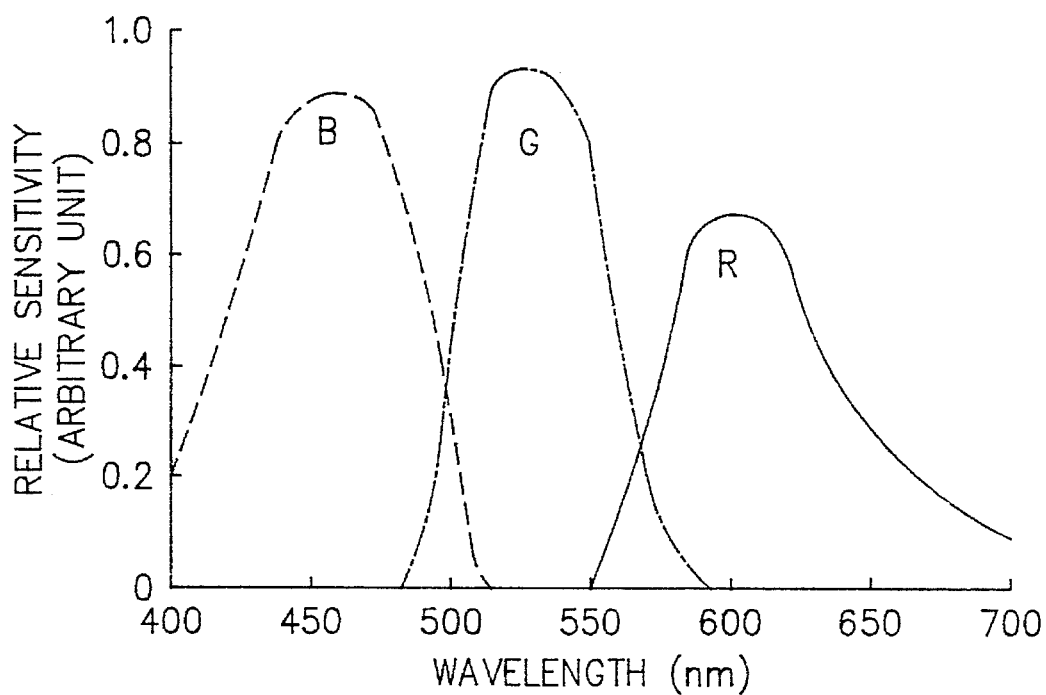
FIG. 19 is a graph showing the spectral response of the color camera included in the measurement apparatus shown in FIG. 18.

FIG. 18 shows an embodiment that uses a white light source and a 3-CCD color camera as the reflected light detector. In FIG. 18, reflected light beams of blue (B), green (G) and red (R) are directed from the magnetic head 21 to CCD arrays 60, 61, and 62 of a color camera 60. FIG. 19 is a graph showing the spectral response of the color camera 60 in which the ordinate represents the outputs of the CCD arrays 60, 61, and 62.

Figure 20:
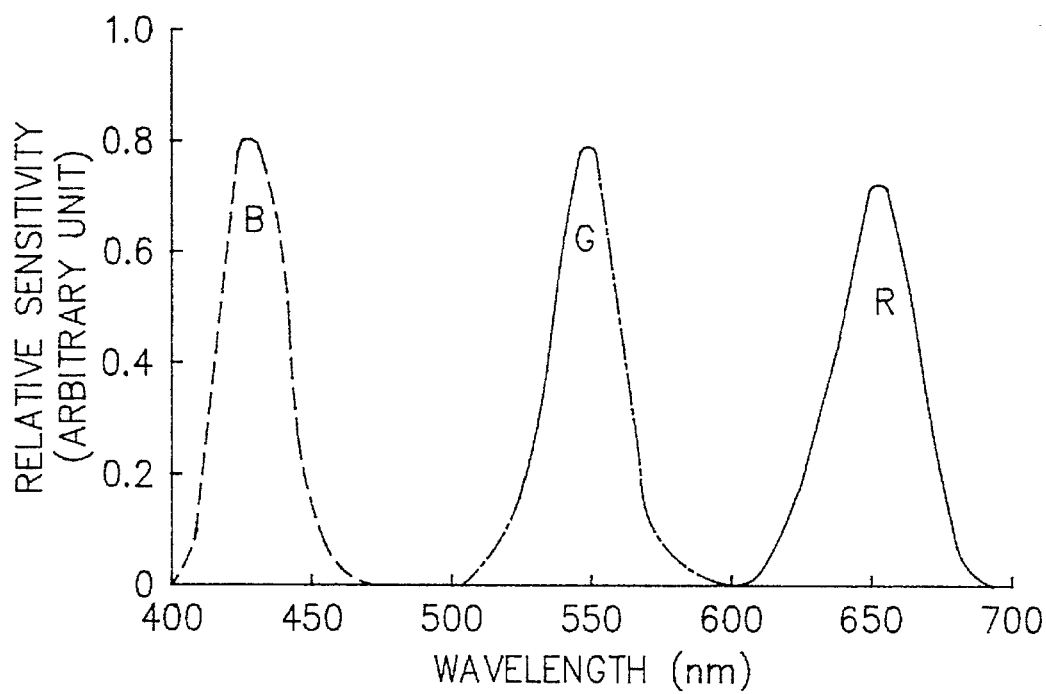
FIG. 20 is a graph showing the spectral response of a color camera using narrow band interference filters.

If the RGB bandpass filters 34 of the color camera 60 are replaced by a narrower bandpass interference filter for RGB signal sampling, such a measuring apparatus will match the three-wavelength laser beam-type apparatus (as described above) in that the amplitude of the reflected light does not decrease when the flying height range is increased. However, care must be taken not to narrow the bandwidths too much because reduction of the reflected light intensity due to excessive bandwidth narrowing will cause a deterioration of the S/N ratio and lower the measurement accuracy. FIG. 20 is an example of a spectral response of a color camera using the narrower bandwidth interference filter. Since the remaining configuration of the measuring apparatus is the same as that of the apparatus in FIG. 7 (embodiment 1), further descriptions are omitted here.

Figures 21, 23:
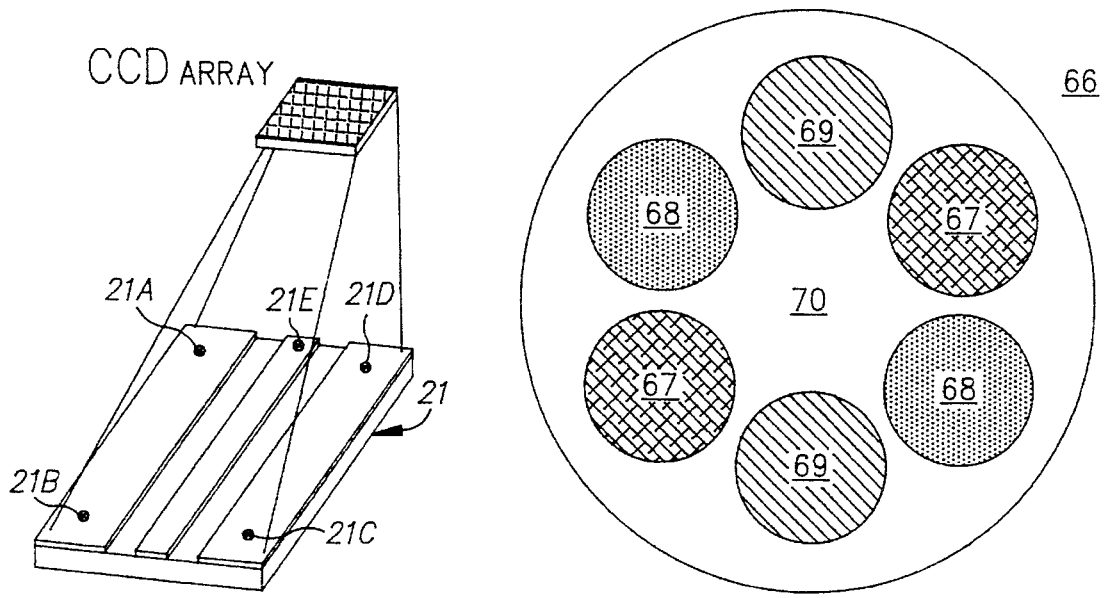
FIG. 21 shows how RGB data is acquired in the measurement apparatus shown in FIG. 18.
FIG. 23 shows rotary three-color filters used in the measurement apparatus shown in FIG. 22.

As shown in FIG. 21, at the time of measurement, RGB image data (756×486 pixels) of the entire visual field of the slider surface, including the R/W gap of the magnetic head 21, are acquired. In FIG. 21, symbols 21A and 21E represent points at which the flying height is measured. During the calculation of the flying height at one point, the average output value of the adjacent 20 pixels is used at each data acquisition.

In judging magnetic head products to be good or defective, the nonflatness and the tilt in the air-bearing condition of the slider surface of the magnetic head are important criteria, in addition to the flying height at the R/W gap portion. To evaluate such features, it is necessary to measure the flying height at a plurality of points on the slider surface of the magnetic head. In the apparatus of this embodiment, the RGB data can be obtained over the entire slider surface of the magnetic head 21 (that is, at a plurality of measurement points) without the need to move the optical system mechanically. Furthermore, if a monitoring device (not shown) is connected to the camera 60, the color of the slider surface can be observed which allows visual inspection by humans.

Although in this embodiment the reflected light is divided into red, green, and blue wavelength components, the three primary colors of the trichromatic specification (e.g., CIE) need not always be employed. It goes without saying that the blue component may be shifted to the shorter wavelength side, and that the red component may be shifted to the longer wavelength side.

Figure 22:
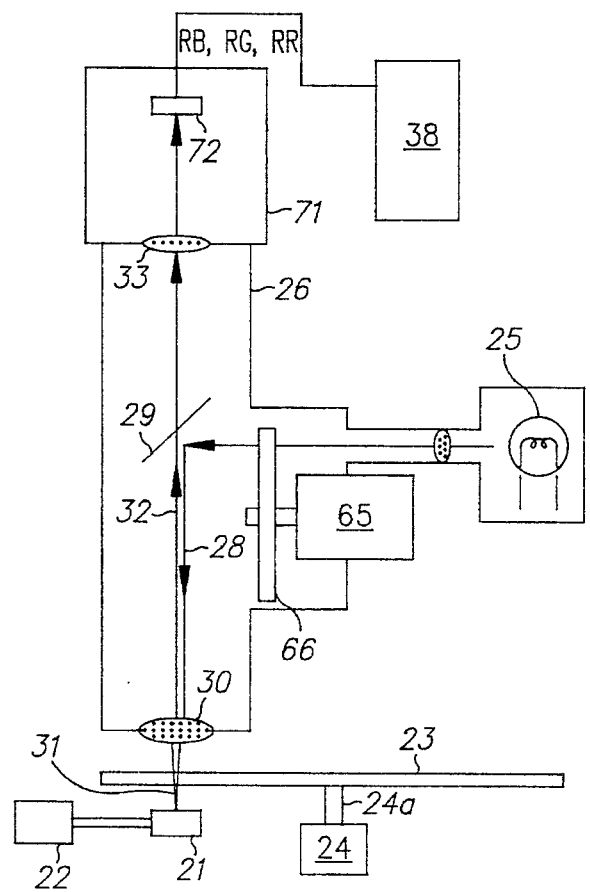
FIG. 22 is a diagram showing the entire configuration of a measurement apparatus according to a fourth embodiment of the invention.

With reference to FIG. 22, a description is given of another embodiment that uses, instead of the color camera, a combination of a black-and-white camera and rotary three-color filters. This embodiment is less expensive than embodiment 3, but can provide the same level of accuracy. The same constituent elements as in embodiment 1 are given the same reference numerals, and their descriptions are omitted. Only the differences from embodiment 1 are described below.

In this embodiment, light 28 emitted from a white light source 25 falls on the magnetic head 21 to be measured via three-color filters 66 rotated by a motor 65. FIG. 23 shows the structure of the rotary three-color filters 65. Interference filters 67, 68, and 69 having respective transmitting colors of blue, green, and red are attached to a glass plate 70. Therefore, the filters 66 can change, in a time-divisional manner, the wavelength of the light 28 that is to fall on the magnetic head 21.

Returning to FIG. 22, a camera 71 is a black-and-white CCD TV camera. A single CCD array 72 is sufficient and no optical system for separating the reflected light 32 into its spectral components is needed. By synchronizing the timing for sampling the output of the black-and-white CCD TV camera 71 with the rotation of the three-color filters 66, the intensities of the reflected light components passing through the interference filters 67, 68, and 69 can be measured during a half-rotation of the glass plate 70. Signals RB, RG, and RR corresponding to the reflected light intensities of blue, green, and red are provided from the CCD TV camera 71 to a signal-processing device 38.

Another measurement apparatus having functions equivalent to those of the FIG. 22 apparatus can be constructed by disposing the rotary filters 66 of the optical system in FIG. 23 so that they direct the reflected light 32 from the magnetic head 21 to the black-and-white CCD TV camera 71. With such an apparatus, the flying height can be measured in a similar manner.

Although four specific embodiments are described above, the apparatus used in the invention to measure the flying height of the head is not limited to those embodiments. For example, an apparatus obtained by replacing the white light source of embodiments 3 and 4 with the three-color laser light source of embodiment 2 is also covered by the invention. In fact, since the helium-cadmium hollow cathode laser has a large output power, sufficiently intense reflected light can be produced even if the optical system is adapted to illuminate the entire slider surface of the magnetic head with the laser light. Therefore, by combining the helium-cadmium hollow cathode laser and the CCD array, the reflected light intensity data of a plurality of measurement points on the slider surface can be obtained at one time.

Estimation of the Flying Height of the Head

According to another aspect of the invention, the estimation of the flying height of the head (on the basis of the reflected light intensity) can be performed in realtime by using the least-square method. The following is a description of the actual method of estimating the flying height of the head in which the method of determining the output function of the flying height measuring apparatus and the gain and offset compensations are first described as prerequisites, and specific calculation procedures are then described for the table look-up technique and the tracking servo technique. The table look-up technique, as well as the tracking servo technique, can be applied to any of the apparatuses of embodiments 1-4.

Method of Determining the Output Function

To actually measure the flying height in the calibration phase, the reflected light intensity is measured for several known flying heights d by using standard gap elements, and the output function of the photodetector is determined in advance by determining the values of the coefficients included in the theoretical equation by fitting the equation to the data thus obtained. Then, in the measurement phase, the flying height is estimated on the basis of the output function by providing the outputs of the photodetector for an unknown flying height to the signal processing device. It is here, when the output function is decided, that the theoretical equation used in determining the output function influences the accuracy and duration of the measurement. In the following, the theoretical equation is discussed.

If the scale factor is eliminated from the consideration, R in Eq. (9) is equal to a calculated output y of the photodetector of the flying height measuring apparatus. Letting x represent the air gap and rearranging Eq. (9), a function f(x) that gives y is obtained:

$$y = f(x) = r_1 \cdot \frac{1 - r_3 \cos(ax - \phi)}{1 - r_2 \cos(ax - \phi)} \quad (15)$$

where $$r_1 = \frac{R_{12} + R_{23}}{1 + R_{12}R_{23}} \quad (>0) \quad (16)$$

$$r_2 = -\frac{2 r_{12} r_{23}}{1 + R_{12}R_{23}} \quad (>0) \quad (17)$$

$$r_3 = -\frac{2 r_{12} r_{23}}{R_{12} + R_{23}} \quad (>0) \quad (18)$$

Further, a is a function of the wavelength λ (refer to Eq. (8)).

To accommodate the cases in which a white light source is used and light that includes components of different wavelengths is detected with a single photodetector (i.e., embodiments of apparatuses 1, 3, and 4), it is necessary, in a strict sense, to take account of the power spectral density of the light source and the wavelength dependence of the transfer function of the optical system. However, satisfactory results can be obtained by employing, as the theoretical equation, Eq. (12) itself or a modification of it. Alternatively, a polynomial of x may be fitted to the actual outputs.

Gain Compensation and Offset Compensation

If the light source, the gain of the photodetector, and the optical system are in completely the same states in both the calibration phase of preparing the output function and the measurement phase of actually measuring an unknown flying height, the flying height can simply be estimated from the outputs of the photodetector obtained in the measurement phase according to the output function prepared in the calibration phase. However, usually they are not expected to be in the same states because drifting over time, changes in the environment, voltage variation, and so on are inevitable. Therefore, an algorithm to compensate for the gain and the offset with respect to the outputs of the photodetector is now proposed. This algorithm consists of the following steps and is performed in both the calibration phase and the measurement phase.

(1) For each measurement point, output from the photodetector is measured while the light source is turned off (dark output) and when the light source is turned on but the head is absent (no head output). The results are designated "Yoff" and "Yopen," respectively.

When x=∞, that is, when the head is absent, no multiple reflection occurs and, therefore Eq. (12) does not hold. In this case, the reflectance is given as follows:

$$Y_{open} = f(\infty, a) = \frac{\{n_1\cos\theta_1 - \sqrt{n_2^2 - n_1^2\sin^2\theta_1}\}^2}{\{n_1\cos\theta_1 + \sqrt{n_2^2 - n_1^2\sin^2\theta_1}\}^2} \quad (19)$$

where $n_1$ is the refractive index of the transparent disk, and $\theta_1$ is the incident angle within the transparent disk. If $\theta_1 = 0$, this equation becomes $$Y_{open} = \frac{(n_1 - n_2)^2}{(n_1 + n_2)^2} \quad (20)$$

Since the value of Yopen is determined only by $n_1$ and $n_2$, it can be used for gain compensation and offset compensation.

(2) An output y of the photodetector is given by the result of the following conversion with respect to an output Ymes of the photodetector that is obtained after loading a standard device (in the case of the calibration phase) or after loading the head to be inspected (in the case of the measurement phase):

$$y = \frac{Y_{mes} - Y_{off}}{Y_{open} - Y_{off}} \quad (21)$$

By the conversion represented by Eq. (21), the offset compensation (i.e., subtraction of Yoff) and the gain compensation are carried out simultaneously. The corrected output values are used to prepare the output function in the calibration phase and to estimate the flying height in the measurement phase.

Table Look-up Technique

In this technique, the gain and offset compensations and the estimation of the flying height are performed at high speed by using a RAM table. The entire processing consists of two phases. The calibration phase includes an off-line calibration step for preparing the output function according to the data obtained by using the standard gap device, and a step for generating a RAM table for the flying height estimation. The measurement phase is a step for estimating the flying height using the RAM table thus generated. These steps are described below for the case in which a camera is used as the photodetector (apparatuses of embodiments 3 and 4).

Calibration Phase (1) Preparation of the Output Function

When the apparatus is sufficiently stable after the power has been switched on and before the standard gap device has been loaded, the no-head outputs obtained from each of the predetermined reference regions (each includes 20 pixels) of a camera image are averaged to obtain no-head outputs $Y_{open_i}$ for R, G, and B, respectively. Further, with the light source turned off, the outputs from each of the same reference regions are averaged to obtain dark outputs $Y_{off_i}$ for R, G, and B, respectively. Then, the outputs from each of the same reference regions obtained when the standard gap device is loaded without rotating the disk are averaged to obtain outputs $Y_{mes_i}$ for R, G, and B, respectively. Subsequently, the outputs $Y_{mes_i}$ are converted according to Eq. (21) to obtain outputs $y_i$. On the basis of the gaps x and the outputs $y_i$ that correspond to the respective reference regions, functions $y_i = f_i(x)$ (i=1, 2, 3) are constructed by polynomial approximation or other means.

(2) Generation of RGB Tables

Tables for obtaining $y_i$ from x are prepared from the output functions for R, G, and B. If the flying height measurement range 0–1,000 nm is divided into $2^{14} = 16K$ equal sections and entries of the tables are provided for the respective sections, the tables have a size of $2^{14} \times 2 \times 3 = 96$ kilobytes.

(3) Generation of Js Table

With respect to the value of $x = x_i$ that is registered in the RGB tables, the sum of the squares of errors $$J = \sum_i \{y_i(x_1) - y_i(x)\}^2 \quad (22)$$

is calculated over the range of $0 \leq x \leq 1,000$ (nm). Then, the minimum Js of local minima other than $x = x_1$ is determined and stored in a table whose size is $2^{14} \times 2 = 32$ kilobytes.

(4) Generation of X Table

A table for obtaining the flying height x from the outputs $y_1$, $y_2$, and $y_3$ for R, G, and B is generated in the following manner. With respect to the given $y_1$, $y_2$, and $y_3$, the value of x that minimizes the sum of the squares of errors $$J = \sum_i \{y_i - f_i(x)\}^2 \quad (23)$$

over the range of $0 \leq x \leq 1,000$ (nm) is determined and is registered at the location in a table whose address is given by $y_1$, $y_2$, and $y_3$. The table will have a size of $2^{6+6+6} \times 2 = 512$ kilobytes.

Measurement Phase (1) Gain Compensation and Offset Compensation

When the apparatus is sufficiently stable after the power has been turned on and before the head to be tested has been loaded, the no-head outputs from each of the regions (each includes 20 pixels) corresponding to the respective measurement points are averaged to obtain no-head outputs $Y_{open_i}$ for R, G, and B. The outputs from each of the same regions obtained when the light source is turned off are averaged to obtain dark outputs $Y_{off_i}$ for R, G, and B. Then, the outputs from each of the same regions obtained when the head to be tested has been loaded and is in the same small area as when the disk is rotated are averaged to obtain outputs $Y_{mes_i}$ for R, G, and B. Subsequently, the outputs $Y_{mes_i}$ are converted according to Eq. (21) to obtain outputs $y_i$. Even if there are many heads to be tested, the no-head outputs and dark outputs repeatedly use the first data obtained.

(2) Estimation of x

The flying height x is calculated back from $y_1$, $y_2$, and $y_3$ by using the X table. In the present embodiment, linear interpolation needs to be applied because each of the addresses in the table has only six bits and the resolution is insufficient. When there is extra time, the measurement accuracy can be improved by performing polynomial interpolation. When there is surplus memory capacity, the interpolation may be omitted if the numbers of bits used for the addresses in the X table have increased in the calibration phase.

(3) Calculation of the Reliability Coefficient

The reliability coefficient $K_R$ for the estimation of the flying height x in the preceding step is calculated as follows:

$$K_R = 1 - (J/J_S)^{0.5} \quad (24)$$

where Js is the table output and J is obtained from Eq. (23).

Example of Measurement

Using the apparatus shown in FIG. 18, the flying height was measured according to the following procedure, and the throughput and measurement accuracy were evaluated.

(1) Generation of the X Table and Js Table

Figure 24:
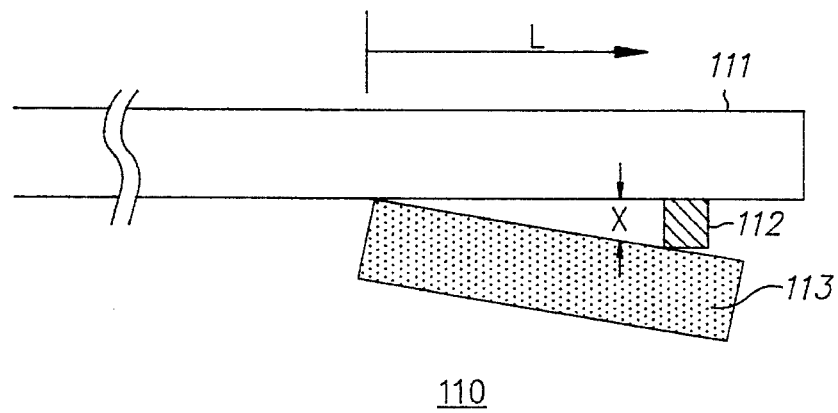
FIG. 24 shows a standard gap device.

FIG. 24 shows a standard gap device 110 in which a pillow 300 nm in height was formed on a glass disk 111 by evaporating a bar-shaped metal thin film 112 thereon, and a magnetic head 113 was fixed thereto with its slider surface (air-bearing surface) facing the glass disk 111. Thus, an air gap having gaps ranging from 0 to 300 nm was produced.

Using the standard gap device 110, the output functions $f_i$ of the R, G, and B CCD arrays of a 3-CCD camera were prepared in the following manner.

Measurement was started one hour after the 3-CCD camera had been turned on.

Outputs (Yopen$_i$, Ymes$_i$, Yoff$_i$) of the 3-CCD camera were temporarily recorded while the distance L from the contact point of the head 113 with the disk 111 to the measurement point was changed. In measuring Yopen$_i$, Yoff$_i$, and Ymes$_i$, RGB image data (756×486 pixels) from the entire visual field of the slider surface was first acquired. Then the data for 20 adjacent pixels was acquired simultaneously and averaged. From the data thus obtained, the values of $y_i$ were calculated according to Eq. (21). By using the air gap x which is calculated from L and $y_i$, approximations of nonlinear output functions $y_i = f_i(x)$ were generated.

On the basis of the functions $f_i$ thus generated, RGB tables, a Js table, and an X table were generated according to the above-described procedure, and stored in the RAM of the signal processing device 38 (see FIG. 18).

(2) Estimation of the Flying Height

Before loading the heads to be tested, the outputs Yopen$_i$, Ymes$_i$, and Yoff$_i$ from the respective measurement points (15 points) were recorded. Then for each head, the outputs Ymes$_i$ were temporarily recorded and subjected to gain and offset compensations. The flying height x was estimated from the corrected RGB data ($y_i$) by using the X table. The image data was acquired and averaged in the same manner as in the calibration phase.

Measurement Results

Figure 25:
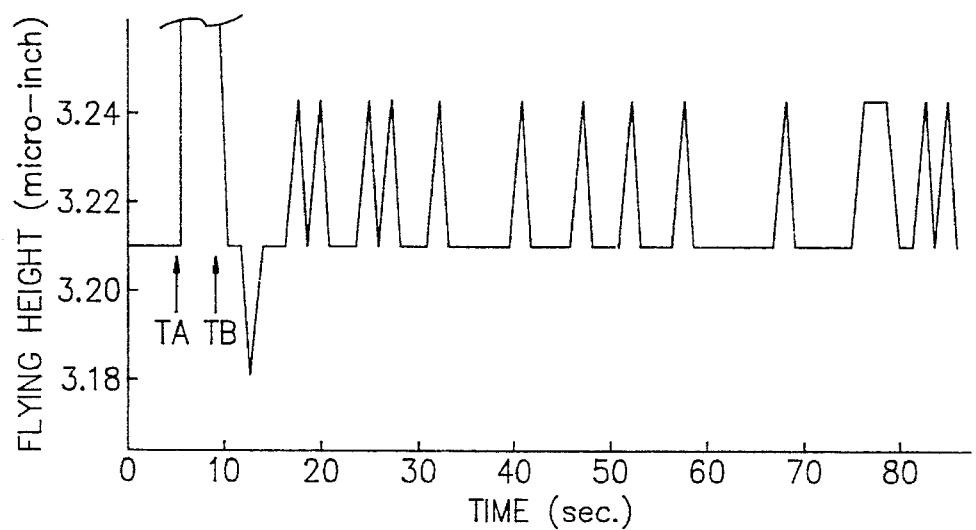
FIG. 25 is a graph showing the results of measurement of the flying height of a magnetic head according to a table look-up technique.

The results of measuring the dynamics of the flying height, where the measurement point was fixed, are described first. FIG. 25 shows the result of a flying height measurement in the vicinity of a pole gap, which was conducted to examine the dynamic behavior of the magnetic head during the loading/unloading operation. The magnetic head, which was flying in a steady state, was unloaded at time TA and loaded again at TB. The abscissa and ordinate of FIG. 25 represent the time and the flying height, respectively, in microinches.

This measurement result shows that the flying height is very stable before and after the operation for loading/unloading the magnetic head. The resolution of the measurement was better than ±1%. Since the resolution is determined by the accuracy of an A/D converter that is used to digitize the output of the CCD, it can be improved further.

In this way, when a decision is made to evaluate whether the magnetic heads are good or defective, measurement of the flying height of each head at 15 points, calculation of the head inclination, and so on requires a total time of around 20 seconds from loading to unloading. In contrast, a conventional apparatus took 90 seconds, even when measurements were made at only 5 points per head. Therefore, the apparatus for measuring flying height according to the invention greatly improves the throughput.

Tracking Servo Technique

Next, a description is given of the principle, global lock-in, and simulation results of the tracking servo-based, high-speed, real-time signal processing algorithm for the flying height estimation.

Figure 26:
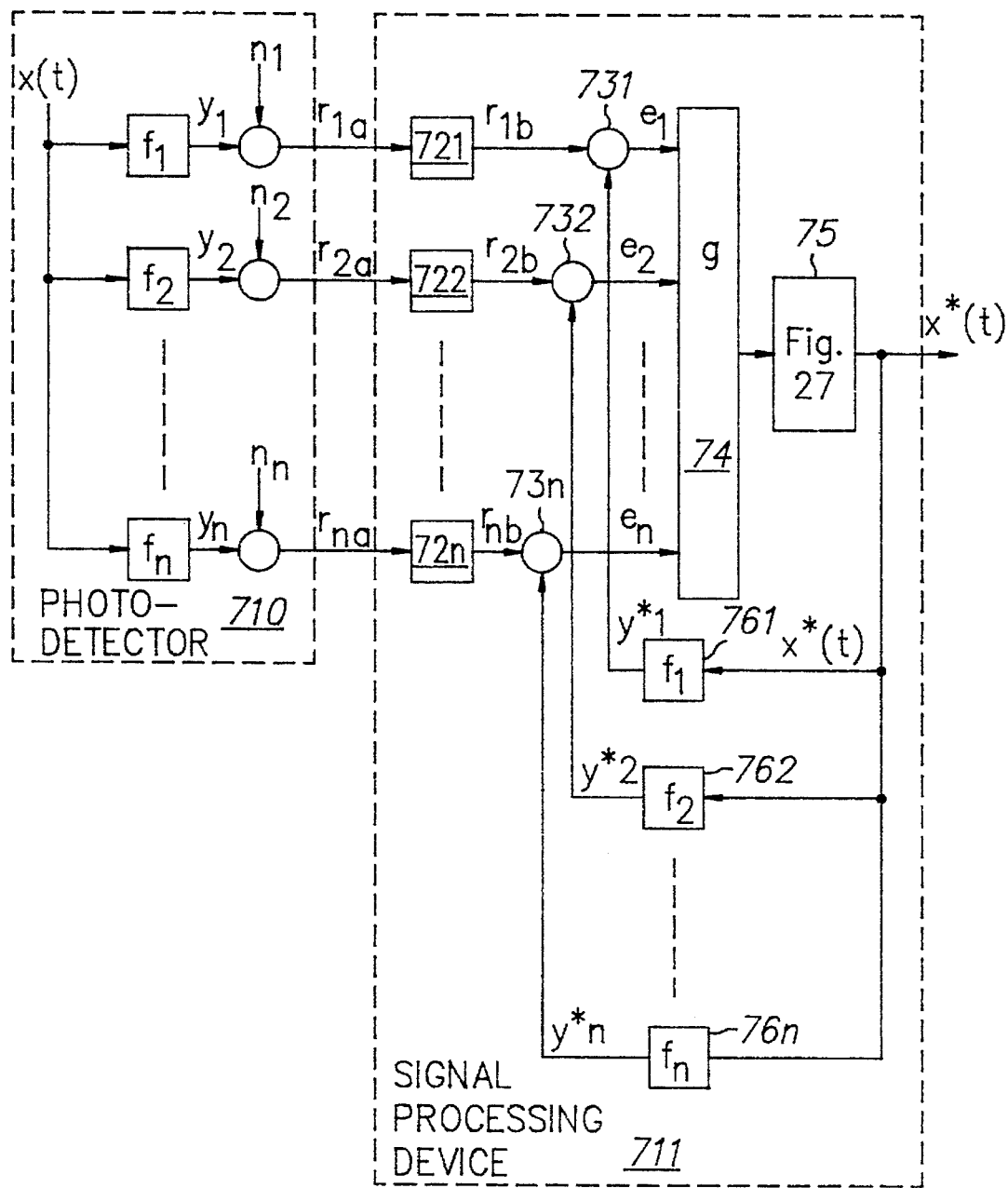
FIG. 26 is a block diagram of a tracking servo system for flying height estimation.

FIG. 26 is a simplified block diagram showing a tracking servo system. Definitions of symbols in FIG. 26 are as follows:

x(t): Flying height of the magnetic head $y_i(t)$: Intensity of the reflected light (theoretical output of the photodetector) of wavelength $\lambda_i$ (i=1 to n, n≥2)

$f_i(x)$: smooth nonlinear function for converting x(t) into $y_i(t)$ $n_i(t)$: Gaussian noise superposed on $y_i(t)$ $r_{ia}(t)$: Output signal of the photodetector=$y_i(t)+n_i(t)$ $r_{ib}(t)$: Noise-eliminated output signal x*(t) Estimation signal of x(t)

y*$_i$(t) Estimation signal of $y_i(t)$ $e_i(t)$: Difference between $r_{ib}(t)$ and y*$_i$(t) (error signal)

J(t): Sum of squared errors

The above definitions and the topology of FIG. 26 lead to the following equations:

$$r_{ia}(t)=y_i(t)+n_i(t)=f_i\{x(t)\}+n_i(t) \quad (25)$$

$$y^*_i(t)=f_i\{x^*(t)\} \quad (26)$$

$$e_i(t)=r_{ib}(t)-y^*_i(t) \quad (27)$$

$$J(t) = \sum_i e_i^2(t) = \sum_i \{r_{ib}(t) - y^*_i(t)\}^2 \quad (28)$$
$$= \sum_i [r_{ib}(t) - f_i\{x^*(t)\}]^2$$

In FIG. 26, noise filters 72l to 72n remove Gaussian noise superimposed on the output of the photodetector of the flying height measuring apparatus. Although the noise filters 72l to 72n are located in a signal processing device 711 in FIG. 26, they may alternatively be provided outside. In the measuring apparatuses of embodiments 3 and 4, which employ a color camera, the noise level is reduced by averaging the outputs from adjacent pixels.

A noise-eliminated measurement signal of wavelength $\lambda_i$ is input to a comparator 73i where the error is calculated from the difference between the signal and an estimation signal $y_i(t)$. The errors calculated for the respective wavelengths are input to an error compiler 74 where they are compiled according to a function g (described later). The output of the error compiler 74 is provided to a flying height integrator 75 where an unknown flying height x(t) is estimated. The details of the flying height estimation device 75 are given later with reference to FIG. 27.

A flying height estimate x*(t) is provided to devices for estimating reflected light intensity, 76l to 76n. The reflected light intensity estimation device 76i outputs $f_i\{x^*(t)\}$. A function $f_i(x)$ and its first derivative $f_i'(x)$ are analytically given by fitting, for each wavelength $\lambda_i$, an appropriate theoretical equation to the measurement data.

The noise filters 72l to 72n, comparators 73l to 73n, error compiler 74, flying height estimation device 75, and reflected light estimation devices 76l to 76n may be implemented by either hardware or software.

The best estimate x*(t) of the unknown signal x(t) can be obtained from the observations $r_i(t)$ if a tracking servo loop is constructed so as to minimize the sum J(t) of squared errors with an appropriate given initial value. However, since this servo loop is a multiple input, nonlinear tracking servo loop including a nonlinear function $f_i(x^*)$, it is difficult to apply conventional control theories thereto. The following time-variant linear control function g is introduced to realize the above-described tracking servo.

$$g(e_1, e_2, \ldots, e_n) = \frac{w_1 e_1 + w_2 e_2 + \ldots + w_n e_n}{w_1^2 + w_2^2 + \ldots + w_n^2} \quad (29)$$

where $$w_1 = \frac{df_i(x^*)}{dx^*} \quad (30)$$

The meaning of Eq. (29) is discussed below. Differentiating Eq. (28) by X* gives $$\frac{dJ}{dx^*} = -2(w_1 e_1 + w_2 e_2 + \ldots + w_n e_n) \quad (31)$$

The terms in parentheses are the same as the numerator of Eq. (29). Since dJ needs to be zero for J to have a minimum, the basic approach to the tracking servo may be to incorporate the right side of Eq. (31) into a feedback loop as a compiled error signal. However, since the loop will include a nonlinear function and each $w_i$ is a function of x*, a small signal gain $$\text{Gain} = 2(w_1^2 + w_2^2 + \ldots w_n^2) \quad (32)$$

of, for instance, the compiled error signal (Eq. (31)) will also be a function of x*. Therefore, conventional control theories based on constant gain are not applicable. To make the gain constant, Eq. (31) should be divided by Eq. (32). The function $g(e_1, e_2, \ldots, e_n)$ is equal to Eq. (31) divided by the above-defined gain, except for the sign. The sign is reversed to form a negative feedback loop or because x* needs to be reduced when Eq. (31) takes a positive value.

Eq. (29) can also be thought of as a weighted summation of update request signals $\Delta x^*_i (= e_i/w_i)$ with weights $w_i^2$. The weights $w_i^2$ are selected so as to maximize the S/N ratio of the output of the compiled error signal $g(e_1, e_2, \ldots, e_n)$ when noises (or measurement errors) are included in the respective measurement signals $r_i(t)$ with the same S/N ratio.

In practical implementation, because the bandwidth of $r_i$ decreases as the wavelength $\lambda_i$ increases, thus allowing more effective noise filtering, the measurement signal $r_i(t)$ of the signal-to-noise ratio is shown to be proportional to $\lambda_i^2$. In this case, the most appropriate weights are $\lambda_i^2 w_i^2$ rather than $w_i^2$. That is, the time-variant linear control function g takes the following form:

$$g(e_1, e_2, \ldots, e_n) = \frac{\lambda_1^2 w_1 e_1 + \lambda_2^2 w_2 e_2 + \ldots + \lambda_n^2 w_m e_n}{w_1^2 + w_2^2 + \ldots + w_n^2} \quad (33)$$

This also corresponds to multiplying the squared errors for the respective wavelengths by the respective weights $\lambda_i^2$ in the definition of the sum of the squared errors J.

Figure 27:
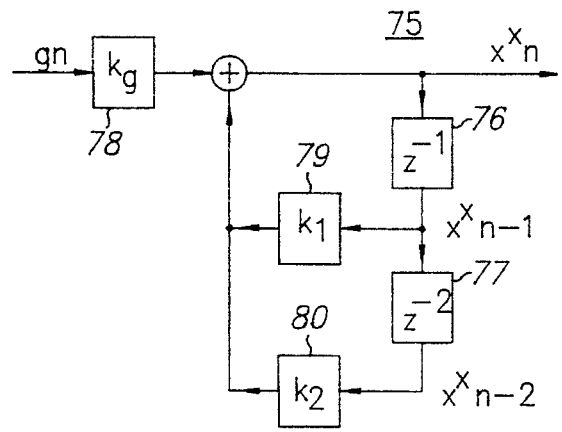
FIG. 27 is a block diagram showing an example of the constitution of a flying height integrator used in the system shown in FIG. 26.

By means of the above error compilation, the servo loop, which originally included a nonlinear function, has been linearized. Therefore, the flying height estimation device 75 can be constructed by using conventional linear control theories. FIG. 27 shows an example of a flying height estimation device 75 that performs sampled value control. Let $x^*_{n-2}$, $x^*_{n-1}$, and $x^*_n$ be flying height estimates at times $t_{n-2}$, $t_{n-1}$, and $t_n$, respectively, and let $g_n$ be a value of the function g at time $t_n$. The estimates $x^*_{n-2}$ and $x^*_{n-1}$ are held in registers 76 and 77, respectively. Multipliers 78, 79, and 80 multiply their inputs by $k_g$, $k_1$, and $k_2$, respectively, where $k_g = 1-\alpha$, $k_1 = 1+\alpha$, and $k_2 = -\alpha$. $\alpha$ is a number ranging from 0 to 1 and is determined in consideration of the flying height variation. The algorithm to be executed by the flying height estimation device 75 is expressed as follows in FORTRAN:

$$\begin{cases} x^*_n = k_g g_n + k_1 x^*_{n-1} + k_2 x^*_{n-2} \\ x^*_{n-2} = x^*_{n-1} \\ x^*_{n-1} = x^*_n \end{cases} \quad (34)$$

While the tracking servo system of FIG. 26 appropriately follows the actual flying height x, the estimate x* approximates x in terms of the minimum squared errors.

(A Scheme to Lock in the Global Optical Solution)

The above-described tracking servo system has a problem that it sometimes falls in a local minimum point when the initial value is not appropriate. This is caused by utilization of technique for zeroing the derivative of the objective function, which is the sum of squared errors, not for directly searching the minimum point. To avoid this problem, the following algorithm is used here.

(1) Determine the range of x*(t) as [0, SPAN].
(2) Give a certain initial value x*(t)=SPAN·K (0<K<1).
(3) Operate the tracking servo for a predetermined period starting from this initial value.
(4) Finish locking in if the sum of squared errors, J, is smaller than a given value $J_{limit}$. (The calculation of $J = \Sigma e_i^2$ is done by a circuit not shown in FIG. 26.)
(5) Cause x*(t) if $J \geq J_{limit}$. That is, repeat from step (2) by giving another suitable K.

In this algorithm, K should start with a value close to the normal measurement range, and uniformly cover the whole range of [0,SPAN] in a set number of iterations. In simulations, K was varied according to the following sequence, providing excellent results for various x values:

K=0.5, 0.25, 0.75, 0,125, 0.875, 0,375, 0.625, 0.01, 0.99

The value of $J_{limit}$ can be set by calculation if the number of wavelengths, wavelength values, range of x, level of noise mixed during the measurement, and other necessary parameters are given. Although the value of K was varied upward and downward alternately in the above example, K may be given according to a different sequence.

(Realization of the Algorithm and Simulation)

Although the above-described tracking servo algorithm can be realized by either a continuous time system or a sampled time system, usually it can be realized more easily by a sampled time system using a microprocessor or the like. An example of a sampled time system has already been shown in FIG. 27.

Although in principle the tracking servo can be effected with only two wavelengths, use of more wavelengths increases both the x range in which locking in to the optimal solution is possible and also the tolerable noise level (or measurement error). Since these factors are also closely dependent on the combination of wavelengths, the power spectral densities of the signal x(t) and noise n(t), and other factors, use of a matched filter will allow greater design optimization. In many actual measurements, gain compensation and offset compensation are necessary. The algorithm for these compensations has already been described above.

A simulation example is described below. The tracking servo performance was examined for each of the multicolor laser lights including two, three, and four wavelength components in the case where the incident angle with respect to the disk-head gap was set at 0 radian. The noise was assumed to be white noise, and a single-pole, low-pass filter was used as the noise filter. The simulation tool was the general purpose dynamic simulation program named DSL (dynamic simulation language), marketed by IBM Corporation.

Figure 28:
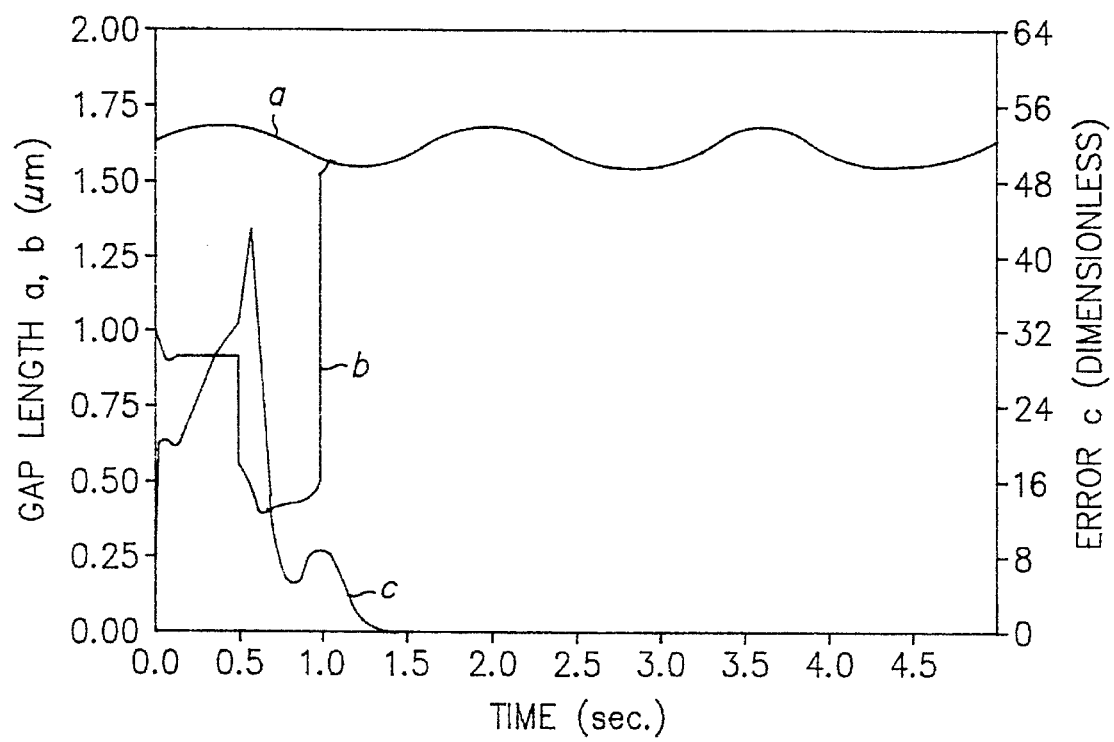
FIG. 28 is a graph showing simulation results of flying height measurement according to the tracking servo system.
Figure 29:
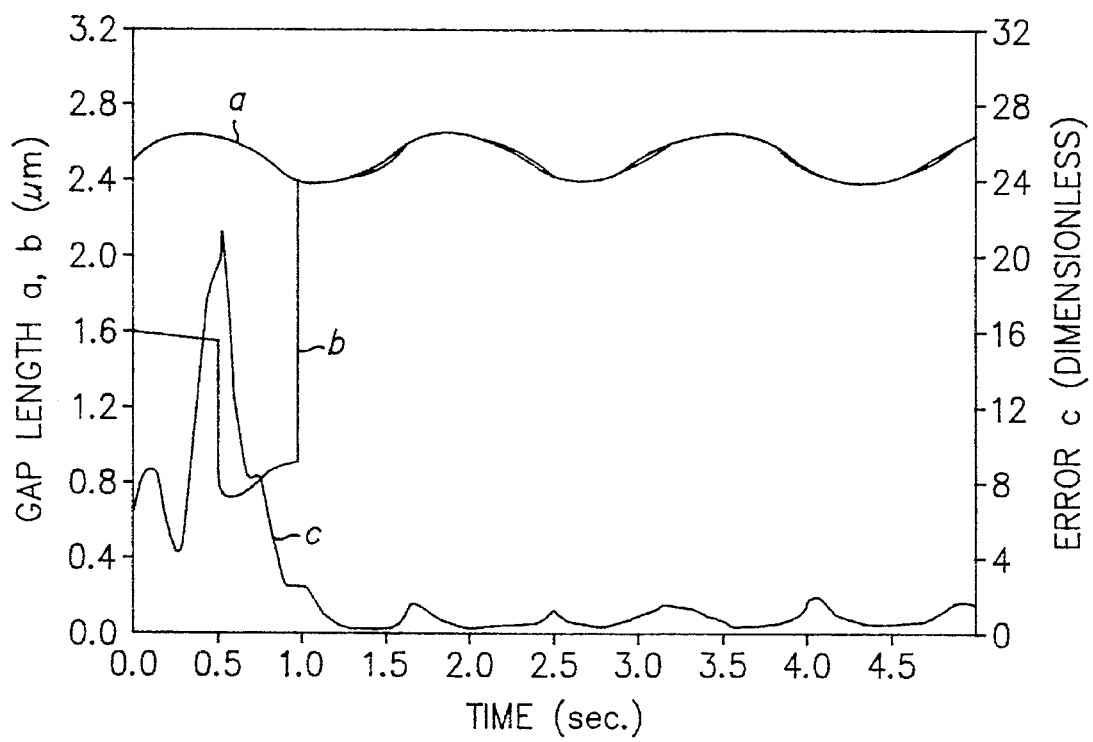
FIG. 29 is a graph showing simulation results of flying height measurement according to the tracking servo system.
Figure 30:
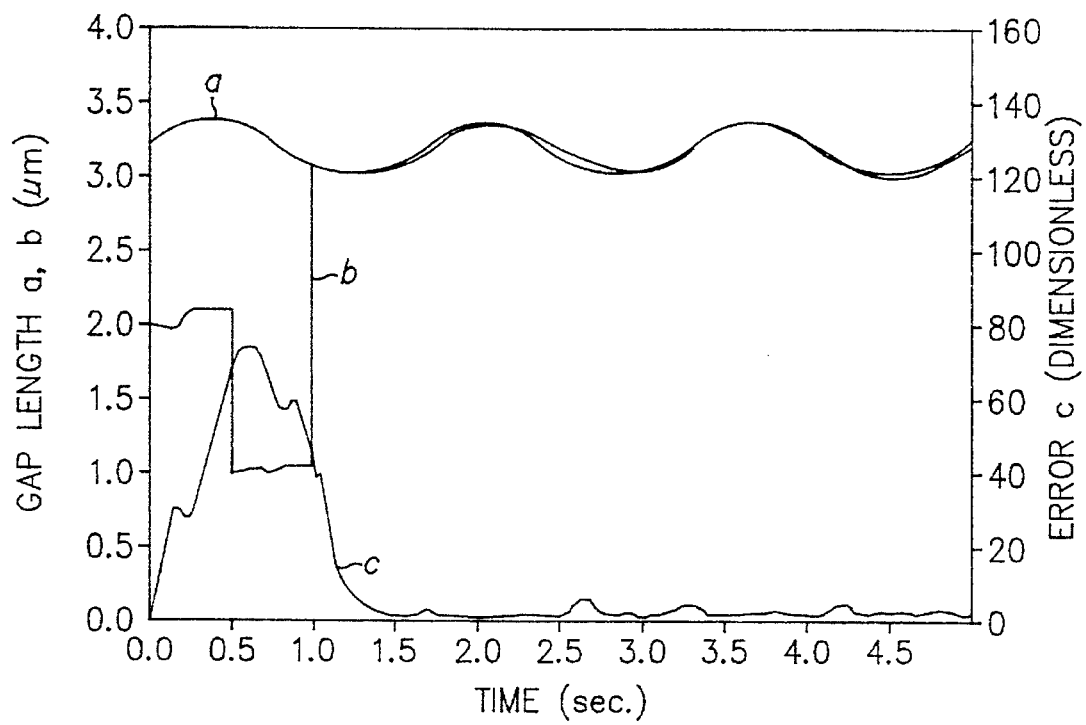
FIG. 30 is a graph showing simulation results of flying height measurement according to the tracking servo system.

FIGS. 28–30 show the simulation results for the cases of two, three, and four wavelengths, respectively. The output function $f_i(x)$ was determined by fitting the theoretical function of Eq. (15) to the measurement data, but neither gain compensation nor offset compensation were performed. In FIGS. 28–30, curves a, b, and e represent the head flying height $x(t)$, the estimated flying height $x^*(t)$, and the sum of the squared errors $J(t)$, respectively. In every case, the estimated flying height $x^*$ reached the actual flying height $x(t)$ within one second from the start of the tracking servo, and thereafter kept following the temporal variation of the flying height $x(t)$. In the case where four wavelengths were used, a highly accurate measurement was performed with an S/N ratio of only 6 dB.

As described above, a low-cost, high-accuracy apparatus for measuring the flying height of a head can be realized through tracking servo signal processing. While this algorithm is superior in following and measuring the dynamic variation of the flying height with high accuracy, it can also be used in a head testing step that requires the flying height measurement to be performed at many points in a short period. Assuming that the maximum loop count per measurement point is 20 when a personal computer is used whose CPU is the Intel 80386SX (20 MHz), the settlement time per measurement point is estimated to be less than 2 seconds. If the head quality is judged by measuring the flying height at 15 points per head and calculating the head tilt and so on, the time required from head loading to unloading amounts to about 33 seconds in total.

The tracking algorithm described here is applicable for the signals combination of not only different frequencies but also same frequency with different phases. One typical application is a position tracking system with a two-phase rotary encoder which gives high resolution and accuracy.

Modifications

Although the embodiments of the entire constitution of the measuring apparatuses and the algorithms for estimating the flying height are described above, the invention is not limited to such embodiments. For example, the invention can be applied to a different type of apparatus for testing the disk surface in which the head is transparent, the light is input to the air gap from the head, and the dynamic variations or the flying height at one or more points are to be followed.

Advantages of the Invention

According to the invention, the flying height of the head can be measured with high accuracy in a short period. Further, since the configuration of the apparatus for measuring the flying height of the head according to the invention is simple, it can be manufactured at a lower cost than conventional apparatuses.

We claim:

1. An apparatus for measuring the flying height of a head that is made to fly by directing an air flow over the surface of a rotating disk, the head having an air-beating surface (ABS) adjacent to the surface of the rotating disk, wherein either the head or the disk has a transparent body and the other has an opaque body, said apparatus comprising:

drive means for rotating said disk;

means for positioning said head above the surface of said disk;

a white light source;

a first optical system for directing light from said white light source to the gap between said disk surface and said adjacent head ABS in such a way that said light is reflected a multitude of times by said disk surface and said adjacent head ABS;

a plurality of photodetector arrays of pixel elements;

a second optical system for dividing said light reflected by said opaque body of either said disk surface or said adjacent head ABS into at least three components each occupying a particular wavelength region, and for directing each component to a different photodetector array, whereby the light impacting each array of pixel elements is representative of light of a corresponding particular wavelength region from a substantial portion of the head ABS; and means for estimating the flying height of said head according to the least-square method from the averaged outputs of a plurality of adjacent pixel elements of each of said photodetector arrays on the basis of predetermined functions relating to said respective wavelength regions, each function correlating a disk-head gap with a reflected light intensity detected by said photodetector arrays.

2. An apparatus for measuring the flying height of a head made to fly by directing an air flow over the surface of a rotating disk, the head having an air-bearing surface (ABS) adjacent to the surface of the rotating disk, wherein either the head or the disk has a transparent body and the other has an opaque body, said apparatus comprising:

drive means for rotating said disk;

means for positioning said head above the surface of said disk;

a white light source;

a first optical system for directing light from said white light source to the gap between said disk surface and said adjacent head ABS in such a way that said light is reflected a multitude of times by said disk surface and said adjacent head ABS;

a photodetector array of pixel elements;

a second optical system for directing said light reflected by said opaque body of either said disk surface or said adjacent head ABS to said photodetector array, whereby the light impacting the array of pixel elements is representative of light from a substantial portion of the head ABS;

either said first optical system or said second optical system including an optical element for transmitting one at a time in a time-divisional way at least three components of said white light, each component occupying a particular wavelength region; and means for estimating the flying height of said head according to the least-square method from the averaged outputs of a plurality of adjacent pixel elements of said photodetector array on the basis of predetermined functions relating to said respective wavelength regions, each function correlating a disk-head gap with a reflected light intensity detected by said photodetector array.

3. The apparatus of claims 1 or 2, wherein said means for estimating flying height performs a real-time calculation.

4. The apparatus of claims 1 or 2, wherein said means for estimating flying height refers to a RAM table prepared in advance for estimating said flying height from said outputs of said photodetector means.

5. The apparatus of claim 4, wherein a reliability coefficient is calculated by referring to a RAM table prepared in advance for calculating the minimum sum of the squared errors in said flying height.

6. The apparatus of claims 1 or 2, wherein said means for estimating flying height calculates the estimated light intensity of each said photodetecting array from the current estimate of the flying height, compiles the error, which is the difference between the measured light intensity and said estimated light intensity, and updates the estimate of the flying height on the basis of said compiled error.

7. The apparatus of claim 6, wherein said compiled error produced by said means for estimating flying height is a linear combination of $w_i e_i$ ($i=1,2,\ldots,n, n \geq 3$), where n is the number of different wavelengths, i is a counter representing an individual one of the n wavelengths, $w_i = df_i(x^*)/dx^*$, $f_i(x)$ is a function prepared in advance that correlates an output $y_i$ of a photodetecting array with a flying height x, $x^*$ is said estimate of the flying height, and $e_i$ is said error representing the difference between said measured light intensity and said estimated light output of said photodetecting array.

8. The apparatus of claim 7, further comprising means for calculating the sum of the squares of said errors $e_i$, and means for comparing with a predetermined value said sum of the squares of said errors after a lapse of a predetermined period and jumping a current estimate of the flying height according to the comparison result.

9. The apparatus of claims 1 or 2, wherein gain compensation and offset compensation are performed on said outputs of each said photodetecting array.

10. The apparatus of claims 1 or 2, wherein said gain compensation and said offset compensation are performed on the basis of prerecorded outputs of each said photodetecting array obtained when said light source is turned off and prerecorded outputs of each said photodetecting array obtained when said light source is turned on but said head is not loaded.

11. The apparatus of claims 1 or 2, wherein the spectra of said respective components of said wavelength regions have a halfwidth not less than 40 nm, and adjacent peaks of said spectra are separated from each other by not less than 60 nm.

* * * * *

UNITED STATES PATENT AND TRADEMARK OFFICE
CERTIFICATE OF CORRECTION

PATENT NO. : 5,475,488
DATED : December 12, 1995
INVENTOR(S) : Fukuzawa et al.

It is certified that error appears in the above-indentified patent and that said Letters Patent is hereby corrected as shown below:

On the title page, item [73] and under item [56], should read:

[73] Assignee: International Business Machines Corporation, Armonk, N.Y.

Attorney information should read:

Attorney, Agent, or Firm--Thomas R. Berthold

Signed and Sealed this

Thirtieth Day of April, 1996

Attest:

BRUCE LEHMAN

*Attesting Officer*      *Commissioner of Patents and Trademarks*